US012640402B2

(12) United States Patent
Eguchi et al.

(10) Patent No.: US 12,640,402 B2
(45) Date of Patent: May 26, 2026

(54) SECONDARY BATTERY

(71) Applicant: MURATA MANUFACTURING CO., LTD., Kyoto (JP)

(72) Inventors: Kenta Eguchi, Kyoto (JP); Masato Ochi, Kyoto (JP); Masahiro Otsuka, Kyoto (JP)

(73) Assignee: MURATA MANUFACTURING CO., LTD., Kyoto-fu (JP)

( * ) Notice: Subject to any disclaimer, the term of this patent is extended or adjusted under 35 U.S.C. 154(b) by 577 days.

(21) Appl. No.: 17/971,100

(22) Filed: Oct. 21, 2022

(65) Prior Publication Data

US 2023/0040384 A1 Feb. 9, 2023

Related U.S. Application Data

(63) Continuation of application No. PCT/JP2021/016297, filed on Apr. 22, 2021.

(30) Foreign Application Priority Data

Apr. 23, 2020 (JP) ................................. 2020-076642

(51) Int. Cl.
*H01M 50/559* (2021.01)
*H01M 10/0585* (2010.01)
(Continued)

(52) U.S. Cl.
CPC ................... *H01M 10/0587* (2013.01); *H01M 10/0585* (2013.01); *H01M 50/342* (2021.01);
(Continued)

(58) Field of Classification Search
CPC ............. H01M 50/342; H01M 50/533; H01M 50/538; H01M 50/559; H01M 10/0587; H01M 10/0585
See application file for complete search history.

(56) References Cited

U.S. PATENT DOCUMENTS

2006/0238162 A1 10/2006 Cheon et al.
2008/0107957 A1* 5/2008 Meguro .............. H01M 50/367
429/56

(Continued)

FOREIGN PATENT DOCUMENTS

CN 209804723 12/2019
GB 2 381 945 5/2023
(Continued)

OTHER PUBLICATIONS

Machine Translation JP2005056649A (Year: 2005).*
(Continued)

*Primary Examiner* — Osei K Amponsah
(74) *Attorney, Agent, or Firm* — K&L Gates LLP

(57) ABSTRACT

Provided is a secondary battery including an electrode assembly and an outer case configured to house the electrode assembly. The secondary battery includes a terminal member provided on the outer case with an insulating material interposed therebetween and connected to a tab of the electrode assembly. The outer case is provided with a cavity through which the tab passes, the terminal member is bonded onto a surface of the outer case with the insulating material interposed therebetween, the surface being positioned around the cavity, and a part of a width dimension of a bonding region provided to surround the cavity for the bonding is reduced.

14 Claims, 16 Drawing Sheets

(51) Int. Cl.
    *H01M 10/0587*      (2010.01)
    *H01M 50/342*      (2021.01)
    *H01M 50/533*      (2021.01)
    *H01M 50/538*      (2021.01)

(52) U.S. Cl.
    CPC ....... *H01M 50/533* (2021.01); *H01M 50/538* (2021.01); *H01M 50/559* (2021.01)

(56) References Cited

U.S. PATENT DOCUMENTS

2017/0141370 A1*   5/2017   Uchida ................. H01M 50/56
2019/0103625 A1    4/2019   Haraguchi et al.

FOREIGN PATENT DOCUMENTS

| | | | |
|---|---|---|---|
| JP | 2004111105 A | 4/2004 | |
| JP | 2005-056649 A * | 3/2005 | ............. H01M 2/30 |
| JP | 2006310308 A | 11/2006 | |
| JP | 2008262827 A | 10/2008 | |
| JP | 2009087722 A | 4/2009 | |
| JP | 2019046639 A | 3/2019 | |
| WO | 2015182136 A1 | 12/2015 | |
| WO | 2017164000 A1 | 9/2017 | |

OTHER PUBLICATIONS

International Search Report of corresponding PCT application PCT/JP2021/016297, dated Jul. 27, 2021.

European Search Report issued Feb. 4, 2025 in corresponding European Application No. 21793290.4.

Japanese Office Action issued Nov. 14, 2023 in corresponding Japanese Application No. 2022-517091.

Chinese Office Action issued Jun. 12, 2023 in corresponding Chinese Application No. 202180030104.5.

Office Action issued for corresponding European Patent Application No. 21793290.4, dated Aug. 18, 2025. (5 pages.).

* cited by examiner (A)

(B)

DIRECTION PERPENDICULAR
TO TANGENT LINE

TANGENT LINE

W

CAVITY

CONTOUR SHAPE
OF CAVITY

SECONDARY BATTERY

CROSS REFERENCE TO RELATED APPLICATIONS

The present application is a continuation of PCT patent application no. PCT/JP2021/016297, filed on Apr. 22, 2021, which claims priority to Japanese patent application no. JP2020-076642, filed on Apr. 23, 2020, the entire contents of which are herein incorporated by reference.

BACKGROUND

The present application relates to a secondary battery, such as, a secondary battery including an electrode assembly having an electrode-constituting layer including a positive electrode, a negative electrode, and a separator.

A secondary battery can be repeatedly charged and discharged because the same is a so-called storage battery, and is used for various applications. For example, the secondary battery is used in a mobile device such as a mobile phone, a smartphone, and a notebook computer.

SUMMARY

The present application relates to a secondary battery.

A conventional secondary battery has a problem to be overcome.

For example, the secondary battery includes an electrode assembly having electrode-constituting layers laminated therein, the electrode-constituting layers including a positive electrode, a negative electrode, and a separator disposed therebetween, and an outer case configured to enclose the electrode assembly. In such a secondary battery, it is conceivable to provide a cleavage mechanism on the assumption of, for example, a case in which the internal pressure of the outer case increases. This is to prevent a more serious accident such as an unintended battery explosion.

For example, it is conceivable to provide the cleavage mechanism for the outer case of the secondary battery. Particularly, it is conceivable to cleave a terminal member provided on the outer case as an electrode terminal so as to open the same. The present application has found that in the case of a terminal member bonded to an outer case using a sealing insulating material, depending on the bonding strength, cleavage may not occur when the internal pressure increases, or unintended cleavage may occur if cleavage occurs according to an embodiment.

The present application has been made in view of the above problems and relates to providing a new battery technique in terms of cleavage of an outer case according to an embodiment.

The present application relates to solving the above problems by addressing the problems in a new direction instead of addressing the same in an extension of a conventional technique according to an embodiment.

A secondary battery according to the present application including an electrode assembly and an outer case configured to house the electrode assembly includes a terminal member provided on the outer case with an insulating material interposed therebetween, the terminal member being connected to a tab of the electrode assembly, in which the outer case is provided with a cavity through which the tab passes, the terminal member is bonded onto a surface of the outer case with the insulating material interposed therebetween, the surface being positioned around the cavity, and a part of a width dimension of a bonding region provided to surround the cavity for the bonding is reduced.

In a secondary battery according to the present application, since a part of a width of a bonding region provided to bond a terminal member and an outer case is reduced, intended cleavage more reliably occurs when the internal pressure of a cell increases. Therefore, a more serious accident such as a battery explosion can be effectively prevented according to an embodiment.

Further, in the secondary battery according to the present application, cleavage is likely to occur at a portion where a part of the width of the bonding region is reduced according to an embodiment. More specifically, since the terminal member is cleaved so as to be opened from a bonding portion having a small width as a starting point, predictability is increased, thereby making it possible to design a more suitable battery according to an embodiment.

DETAILED DESCRIPTION

Figure 1:
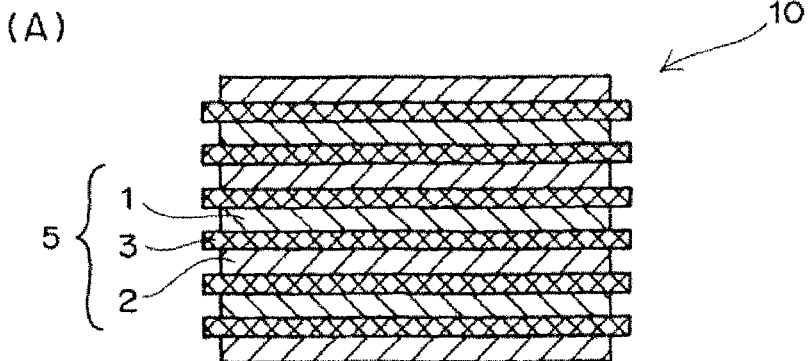
FIG. 1 is a sectional view schematically illustrating an electrode-constituting layer (View (A): planar laminated structure, View (B): wound structure).
Figure 1:
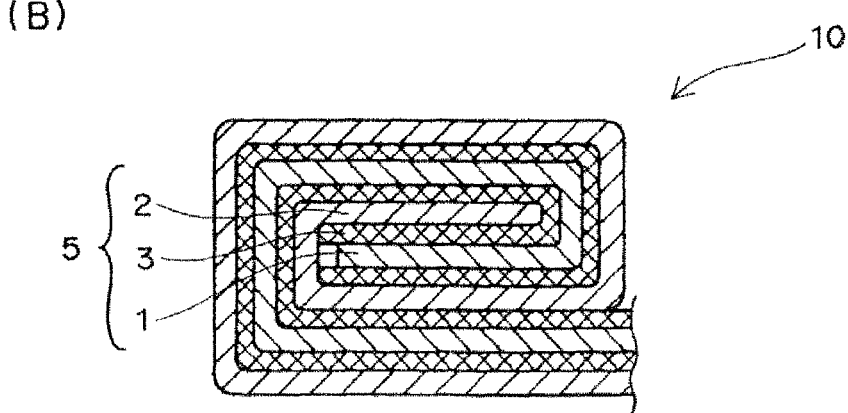

Hereinafter, a secondary battery according to an embodiment of the present application will be described in more detail. Although the description will be made with reference to the drawings as necessary, various elements in the drawings are merely illustrated schematically and exemplarily for the understanding of the present application, and appearance and/or a dimensional ratio, and the like may be different from actual ones.

A "sectional view" described directly or indirectly in the present specification is based on a virtual cross section obtained by cutting the secondary battery along a laminating direction of an electrode assembly or an electrode-constituting layer forming the secondary battery. Similarly, a direction of a "thickness" described directly or indirectly in the present specification is based on a laminating direction of electrode materials forming the secondary battery. For example, in the case of a "secondary battery having a thickness in a plate shape" such as a button type or a coin type, a direction of a "thickness" corresponds to a plate thickness direction of the secondary battery. The term "plan view" or "planar view shape" used in the present specification is based on a sketch drawing when an object is viewed from an upper side or a lower side along the thickness direction (that is, the laminating direction).

In addition, a "vertical direction" and a "horizontal direction" used directly or indirectly in the present specification correspond to a "vertical direction" and a "horizontal direction" in the drawings, respectively. Unless otherwise specified, the same reference numerals or symbols denote the same members or parts or the same semantic contents. In a preferred aspect, while the laminating direction of the electrode assembly can correspond to the vertical direction, it can be understood that a downward direction in the vertical direction (that is, a direction in which gravity acts) corresponds to a "downward direction" and an opposite direction thereof corresponds to an "upward direction".

The term "secondary battery" as used in the present specification refers to a battery capable of being repeatedly charged and discharged. Therefore, the secondary battery according to the present application is not excessively limited by its name, and for example, a power storage device or the like can also be included in the target.

The secondary battery according to the present application includes an electrode assembly having electrode-constituting layers laminated therein, the electrode-constituting layers including a positive electrode, a negative electrode, and a separator. FIG. 1, views A and B, illustrate an electrode assembly 10. As illustrated in the drawings, a positive electrode 1 and a negative electrode 2 are laminated with a separator 3 interposed therebetween to form an electrode-constituting layer 5, and at least one or more of the electrode-constituting layers 5 are laminated to form the electrode assembly 10. FIG. 1, view (A), has a planar laminated structure in which the electrode-constituting layers 5 are laminated in a planar shape without being wound. On the other hand, FIG. 1, view (B), has a wound laminated structure in which the electrode-constituting layer 5 is wound in a wound shape. That is, in FIG. 1, view (B), the electrode-constituting layer 5 including the positive electrode 1, the negative electrode 2, and the separator 3 disposed between the positive electrode 1 and the negative electrode 2 has a wound structure in which the electrode-constituting layer 5 is wound in a roll shape. In the secondary battery, such an electrode assembly is enclosed in an outer case together with an electrolyte (for example, a non-aqueous electrolyte). The structure of the electrode assembly is not necessarily limited to the planar laminated structure or the wound structure. For example, the electrode assembly may have a so-called stacked-and-folded type structure in which the positive electrode, the separator, and the negative electrode are laminated on a long film and then folded.

The positive electrode is formed of at least a positive electrode material layer and a positive electrode current collector. In the positive electrode, the positive electrode material layer is provided on at least one surface of the positive electrode current collector. The positive electrode material layer contains a positive electrode active material as an electrode active material. For example, in each of the plurality of positive electrodes in the electrode assembly, the positive electrode material layer may be provided on both surfaces of the positive electrode current collector, or the positive electrode material layer may be provided only on one surface of the positive electrode current collector.

The negative electrode is formed of at least a negative electrode material layer and a negative electrode current collector. In the negative electrode, the negative electrode material layer is provided on at least one surface of the negative electrode current collector. The negative electrode material layer contains a negative electrode active material as an electrode active material. For example, in each of the plurality of negative electrodes in the electrode assembly, the negative electrode material layer may be provided on both surfaces of the negative electrode current collector, or the negative electrode material layer may be provided only on one surface of the negative electrode current collector.

The electrode active materials contained in the positive electrode and the negative electrode, that is, the positive electrode active material and the negative electrode active material are materials directly involved in the transfer of electrons in the secondary battery, and are main materials of the positive and negative electrodes responsible for charging and discharging, that is, a battery reaction. More specifically, ions are brought in the electrolyte due to the "positive electrode active material contained in the positive electrode material layer" and the "negative electrode active material contained in the negative electrode material layer", and such ions move between the positive electrode and the negative electrode to transfer electrons, thereby performing charging and discharging. The positive electrode material layer and the negative electrode material layer may be particularly layers capable of occluding and releasing lithium ions. That is, the secondary battery according to the present application may be a non-aqueous electrolyte secondary battery in which lithium ions move between a positive electrode and a negative electrode through a non-aqueous electrolyte to charge and discharge a battery. When lithium ions are involved in charging and discharging, the secondary battery according to the present application corresponds to a so-called "lithium ion battery", and the positive electrode and the negative electrode include a layer capable of occluding and releasing lithium ions.

The positive electrode active material of the positive electrode material layer is formed of, for example, a granular material, and a binder may be contained in the positive electrode material layer for more sufficient contact between particles and shape retention. Furthermore, a conductive auxiliary agent may be contained in the positive electrode material layer in order to facilitate the transfer of electrons promoting a battery reaction. Similarly, while the negative electrode active material of the negative electrode material layer is formed of, for example, a granular material, a binder may be contained for more sufficient contact between particles and shape retention, and a conductive auxiliary agent may be contained in the negative electrode material layer in order to facilitate the transfer of electrons promoting a battery reaction. As described above, since a plurality of components are contained, the positive electrode material layer and the negative electrode material layer can also be referred to as a "positive electrode mixture layer" and a "negative electrode mixture layer", respectively.

The positive electrode active material may be a material that contributes to occlusion and release of lithium ions. From such a viewpoint, the positive electrode active material may be, for example, a lithium-containing composite oxide. More specifically, the positive electrode active material may be a lithium-transition metal composite oxide containing lithium and at least one transition metal selected from a group consisting of cobalt, nickel, manganese, and iron. That is, in the positive electrode material layer of the secondary battery according to the present application, such a lithium-transition metal composite oxide is preferably contained as a positive electrode active material. For example, the positive electrode active material may be lithium cobaltate, lithium nickelate, lithium manganate, lithium iron phosphate, or a material obtained by replacing a part of these transition metals with another metal. Such a positive electrode active material may be contained as a single type, but two or more types thereof may be combined and contained.

The binder that can be contained in the positive electrode material layer is not particularly limited, but examples thereof can include at least one selected from a group consisting of polyvinylidene fluoride, a vinylidene fluoride-hexafluoropropylene copolymer, a vinylidene fluoride-tetrafluoroethylene copolymer, and polytetrafluoroethylene. The conductive auxiliary agent that can be contained in the positive electrode material layer is not particularly limited, but examples thereof can include at least one selected from carbon blacks such as thermal black, furnace black, channel black, ketjen black, and acetylene black, carbon fibers such as graphite, carbon nanotube, and vapor-grown carbon fiber, metal powders such as copper, nickel, aluminum, and silver, and polyphenylene derivatives.

A thickness dimension of the positive electrode material layer is not particularly limited, but may be 1 µm or more and 300 µm or less, and is, for example, 5 µm or more and 200 µm or less. The thickness dimension of the positive electrode material layer is a thickness inside the secondary battery, and an average value of measured values at any 10 points may be adopted.

The negative electrode active material may be a material that contributes to occlusion and release of lithium ions. From such a viewpoint, the negative electrode active material may be, for example, various carbon materials, oxides, and/or lithium alloys.

Examples of various carbon materials of the negative electrode active material can include graphite (natural graphite and/or artificial graphite), hard carbon, soft carbon, and/or diamond-like carbon. Particularly, graphite has high electron conductivity and excellent adhesion to the negative electrode current collector. An example of the oxide of the negative electrode active material can include at least one selected from a group consisting of silicon oxide, tin oxide, indium oxide, zinc oxide, and lithium oxide. The lithium alloy of the negative electrode active material may be any metal that can be alloyed with lithium, and may be, for example, a binary, ternary, or higher alloy of lithium and a metal such as Al, Si, Pb, Sn, In, Bi, Ag, Ba, Ca, Hg, Pd, Pt, Te, Zn, and La. Such an oxide may be amorphous as a structural form thereof. This is because deterioration due to non-uniformity such as crystal grain boundaries or defects is less likely to occur.

The binder that can be contained in the negative electrode material layer is not particularly limited, but examples thereof can include at least one selected from a group consisting of styrene-butadiene rubber, polyacrylic acid, polyvinylidene fluoride, a polyimide resin, and a polyamideimide resin. The conductive auxiliary agent that can be contained in the negative electrode material layer is not particularly limited, but examples thereof can include at least one selected from carbon blacks such as thermal black, furnace black, channel black, ketjen black, and acetylene black, carbon fibers such as graphite, carbon nanotube, and vapor-grown carbon fiber, metal powders such as copper, nickel, aluminum and silver, and polyphenylene derivatives. The negative electrode material layer may contain a component derived from a thickener component (for example, carboxymethyl cellulose) used at the time of manufacturing a battery.

A thickness dimension of the negative electrode material layer is not particularly limited, but may be 1 µm or more and 300 µm or less, and is, for example, 5 µm or more and 200 µm or less. The thickness dimension of the negative electrode material layer is a thickness inside the secondary battery, and an average value of measured values at any 10 points may be adopted.

The positive electrode current collector and the negative electrode current collector used for the positive electrode and the negative electrode are members configured to contribute to collecting and supplying electrons generated in the electrode active material due to the battery reaction. Such an electrode current collector may be a sheet-like metal member. Further, the electrode current collector may have a porous or perforated form. For example, the current collector may be a metal foil, a punching metal, a net or an expanded metal, or the like. The positive electrode current collector used for the positive electrode is preferably made of a metal foil containing at least one selected from a group consisting of aluminum, stainless steel, nickel, and the like, and may be, for example, an aluminum foil. On the other hand, the negative electrode current collector used for the negative electrode is preferably made of a metal foil containing at least one selected from a group consisting of copper, stainless steel, nickel, and the like, and may be, for example, a copper foil.

A thickness dimension of each of the positive electrode current collector and the negative electrode current collector is not particularly limited, but may be 1 µm or more and 100 µm or less, and is, for example, 10 µm or more and 70 µm or less. The thickness dimension of each of the positive electrode current collector and the negative electrode current collector is a thickness inside the secondary battery, and an average value of measured values at any 10 points may be adopted.

The separator used for the positive electrode and the negative electrode is a member provided from the viewpoint of preventing a short circuit due to contact between the positive electrode and the negative electrode, electrolyte retention, and the like. In other words, it can be said that the separator is a member configured to allow ions to pass while preventing electronic contact between the positive electrode and the negative electrode. For example, the separator is a porous or microporous insulating member, and has a membrane form due to its small thickness. As a mere example, a microporous membrane made of polyolefin may be used as the separator. In this regard, the microporous membrane used as the separator may contain, for example, only polyethylene (PE) or only polypropylene (PP) as polyolefin. Furthermore, the separator may be a laminated body formed of a "microporous membrane made of PE" and a "microporous membrane made of PP". A surface of the separator may be covered with an inorganic particle coating layer and/or an adhesive layer. The surface of the separator may have adhesiveness. In the present application, the separator is not to be particularly limited by its name, and may be solid electrolytes, gel electrolytes, and/or insulating inorganic particles having a similar function.

A thickness dimension of the separator is not particularly limited, but may be 1 µm or more and 100 µm or less, and is, for example, 2 µm or more and 20 µm or less. The thickness dimension of the separator is a thickness inside the secondary battery (particularly, a thickness between the positive electrode and the negative electrode), and an average value of measured values at any 10 points may be adopted.

In the secondary battery of the present application, the electrode assembly including the electrode-constituting layer including the positive electrode, the negative electrode, and the separator may be enclosed in the outer case together with an electrolyte. The electrolyte may be a "non-aqueous" electrolyte containing an organic electrolyte, an organic solvent, and the like, or may be an "aqueous" electrolyte containing water. When the positive electrode and the negative electrode have a layer capable of occluding and releasing lithium ions, the secondary battery preferably contains a "non-aqueous" electrolyte. That is, the electrolyte is preferably a non-aqueous electrolyte. In the electrolyte, metal ions released from the electrode (the positive electrode and/or the negative electrode) are present, and therefore the electrolyte can assist the movement of metal ions in the battery reaction. The electrolyte may have a form such as a liquid form or a gel form.

The non-aqueous electrolyte is an electrolyte containing a solvent and a solute. The solvent may be an organic solvent. The specific organic solvent of the non-aqueous electrolyte may contain at least carbonate. The carbonate may be cyclic carbonate and/or chain carbonate. Although not particularly limited, an example of the cyclic carbonate can include at least one selected from a group consisting of propylene carbonate (PC), ethylene carbonate (EC), butylene carbonate (BC), and vinylene carbonate (VC). An example of the chain carbonate can include at least one selected from a group consisting of dimethyl carbonate (DMC), diethyl carbonate (DEC), ethyl methyl carbonate (EMC), and dipropyl carbonate (DPC). As a mere example, a combination of cyclic carbonate and chain carbonate may be used as a non-aqueous electrolyte, and for example, a mixture of ethylene carbonate and diethyl carbonate may be used. As a specific solute of the non-aqueous electrolyte, for example, a Li salt such as $LiPF_6$ and/or $LiBF_4$ may be used.

The outer case of the secondary battery is a member configured to enclose the electrode assembly having the electrode-constituting layers laminated therein, wherein the electrode assembly includes the positive electrode, the negative electrode, and the separator. As will be described later, the outer case may be a metal outer case having a non-laminated configuration.

The secondary battery of the present application has characteristics regarding an outer case configured to enclose an electrode assembly and a peripheral component thereof. Particularly, the secondary battery has characteristics in terms of elements related to the outer case of the secondary battery and a terminal member attached thereto.

In the secondary battery of the present application, a bonding region between the outer case and the terminal member has not been previously found. The terminal member forming an electrode terminal (a positive electrode terminal or a negative electrode terminal) of the secondary battery is provided on the outer case with an insulating material interposed therebetween, and is connected to a tab of the electrode assembly. The outer case is provided with a cavity through which the tab passes, and the terminal member is bonded onto a surface of the outer case around the cavity with the insulating material interposed therebetween. In the present application, in a plan view, a part of a width dimension of the bonding region provided to surround a periphery of the cavity for the bonding is reduced.

Figure 2:
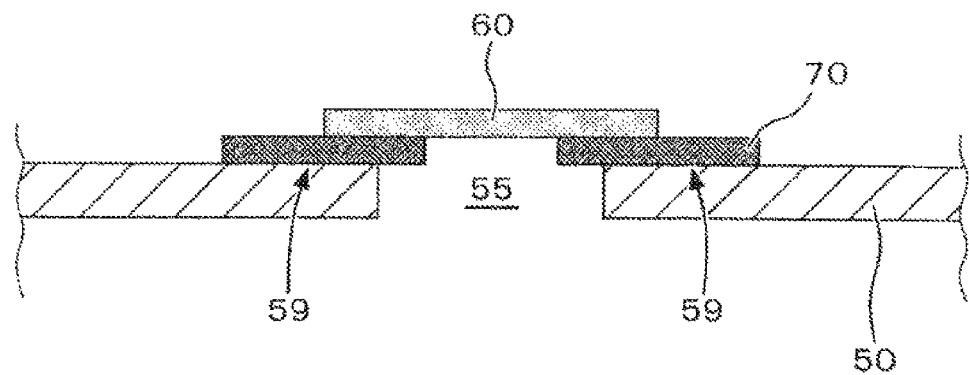
FIG. 2 is a schematic sectional view illustrating an arrangement relationship of elements forming a secondary battery (particularly, an outer case, a terminal member, and an insulating material).

FIG. 2 illustrates a sectional view of a mutual arrangement relationship among an outer case 50, a terminal member 60, and an insulating material 70. As can be seen from the form illustrated in FIG. 2, the insulating material 70 is interposed between the outer case 50 and the terminal member 60. The outer case 50 includes a cavity 55, and the insulating material 70 is disposed on an outer case surface 59 around the cavity 55. The terminal member 60 is provided on the insulating material 70 so as to close the cavity 55 from the outside. That is, the insulating material is sandwiched between the terminal member and the outer case in the bonding region.

Figure 3A:
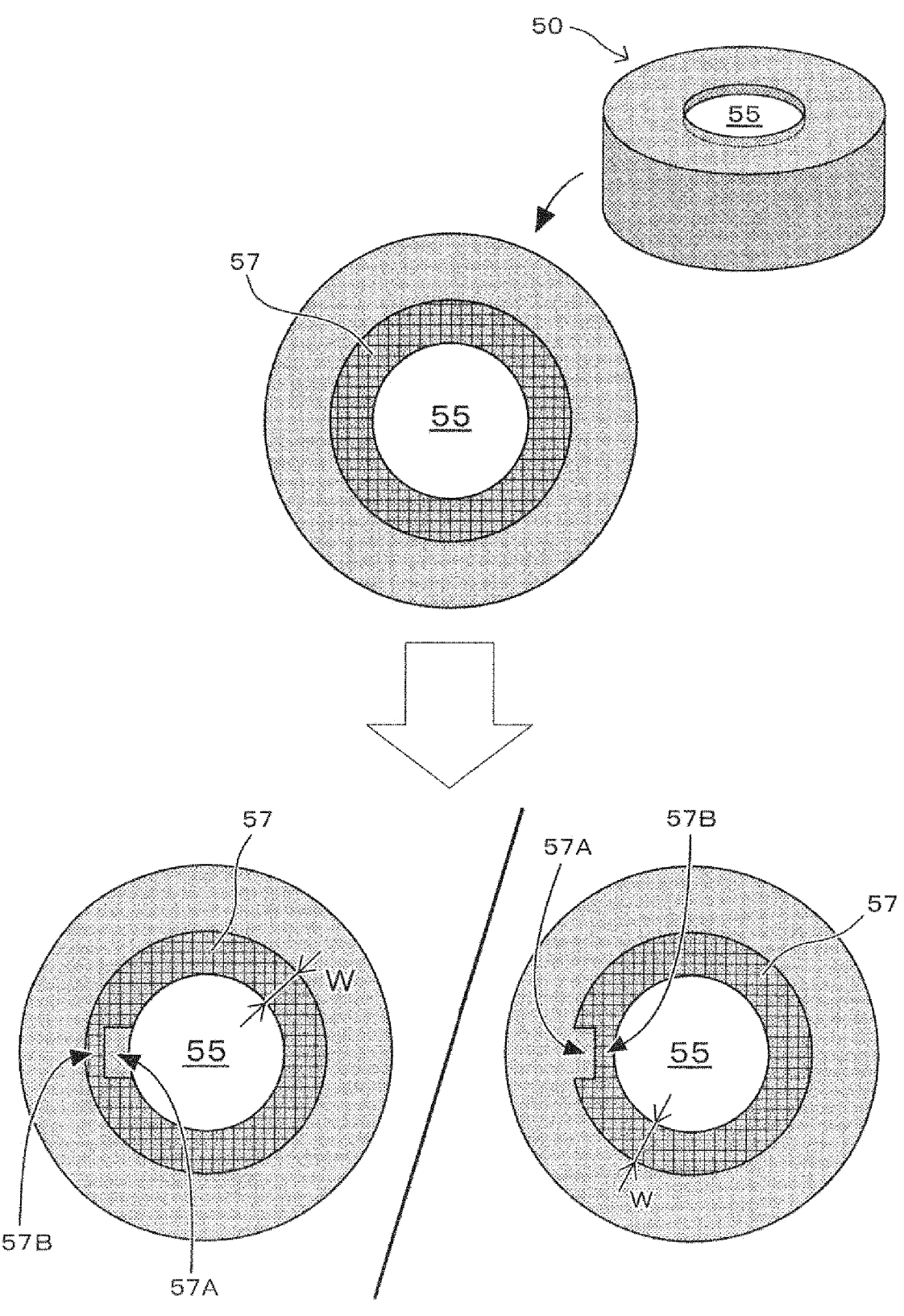
FIG. 3A is a schematic diagram illustrating the present application according to an embodiment.
Figure 4:
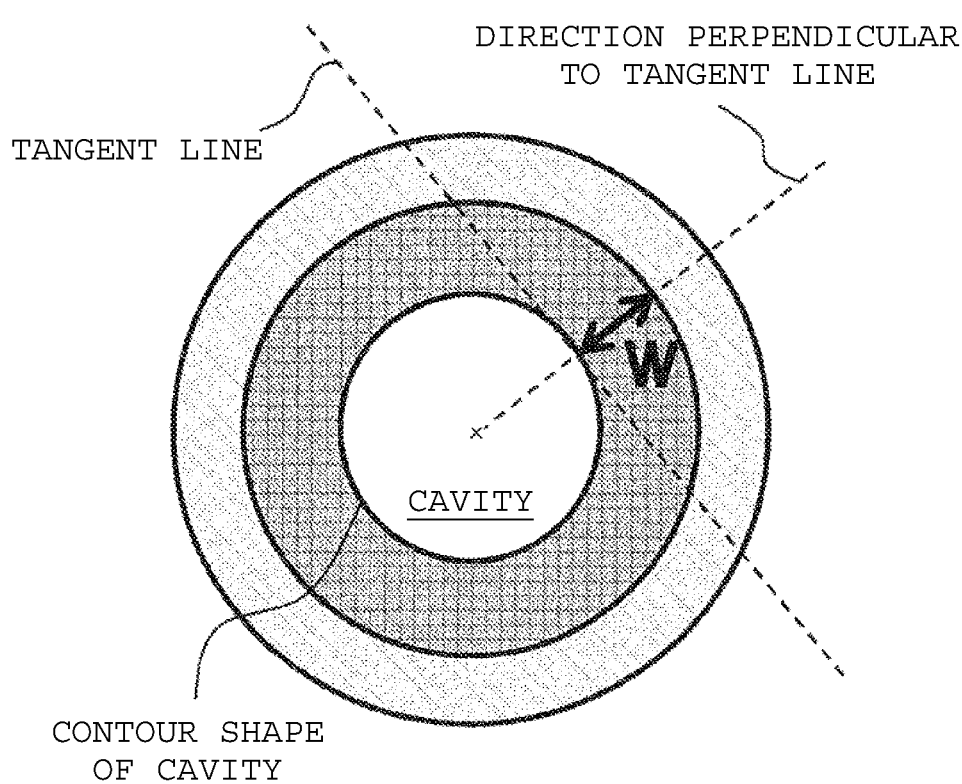
FIG. 4 is a schematic diagram illustrating a "width dimension".

In the present application, as illustrated in FIG. 3A, a part of a width dimension W of a bonding region 57 positioned around the cavity 55 of the outer case 50 is reduced (refer to the lower view of FIG. 3A). Particularly, in the aspect illustrated in the drawing, the width dimension W of the bonding region 57 is not constant along a circumferential direction of the cavity 55 and is non-constant, and is reduced at a certain portion. For example, a bonding region having an annular shape in a plan view may have a portion, the width dimension W of which changes. The "width dimension W" referred to in the present specification may be a dimension in a direction perpendicular to a tangent line of a contour shape of the cavity in a plan view (refer to FIG. 4).

As can be seen from the aspect illustrated on the lower side of FIG. 3A, a part of the width dimension W of the planar view shape of the bonding region 57 may be reduced by having a recessed portion 57A in a part thereof. In other words, a part of the width dimension W may be reduced so that the planar view shape of the bonding region 57 has a narrow portion 57B in a part thereof. That is, when viewed along the circumferential direction of the cavity 55, the width dimension of the bonding region 57 having an annular shape in a plan view is not all constant, and is preferably non-constant due to the recessed portion 57A and the narrow portion 57B.

Figure 3B:
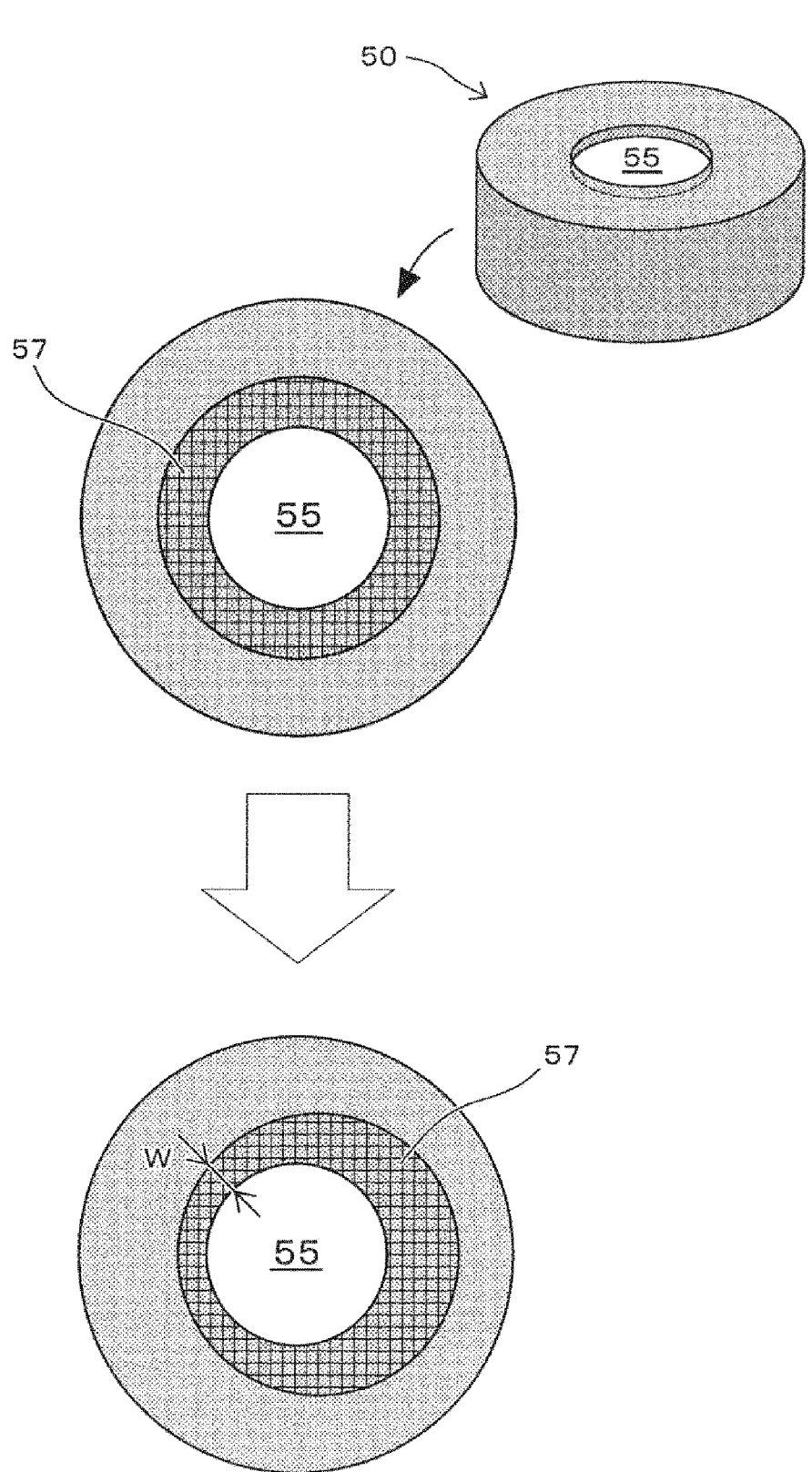
FIG. 3B is a schematic diagram illustrating the present application according to another embodiment.
Figure 5:
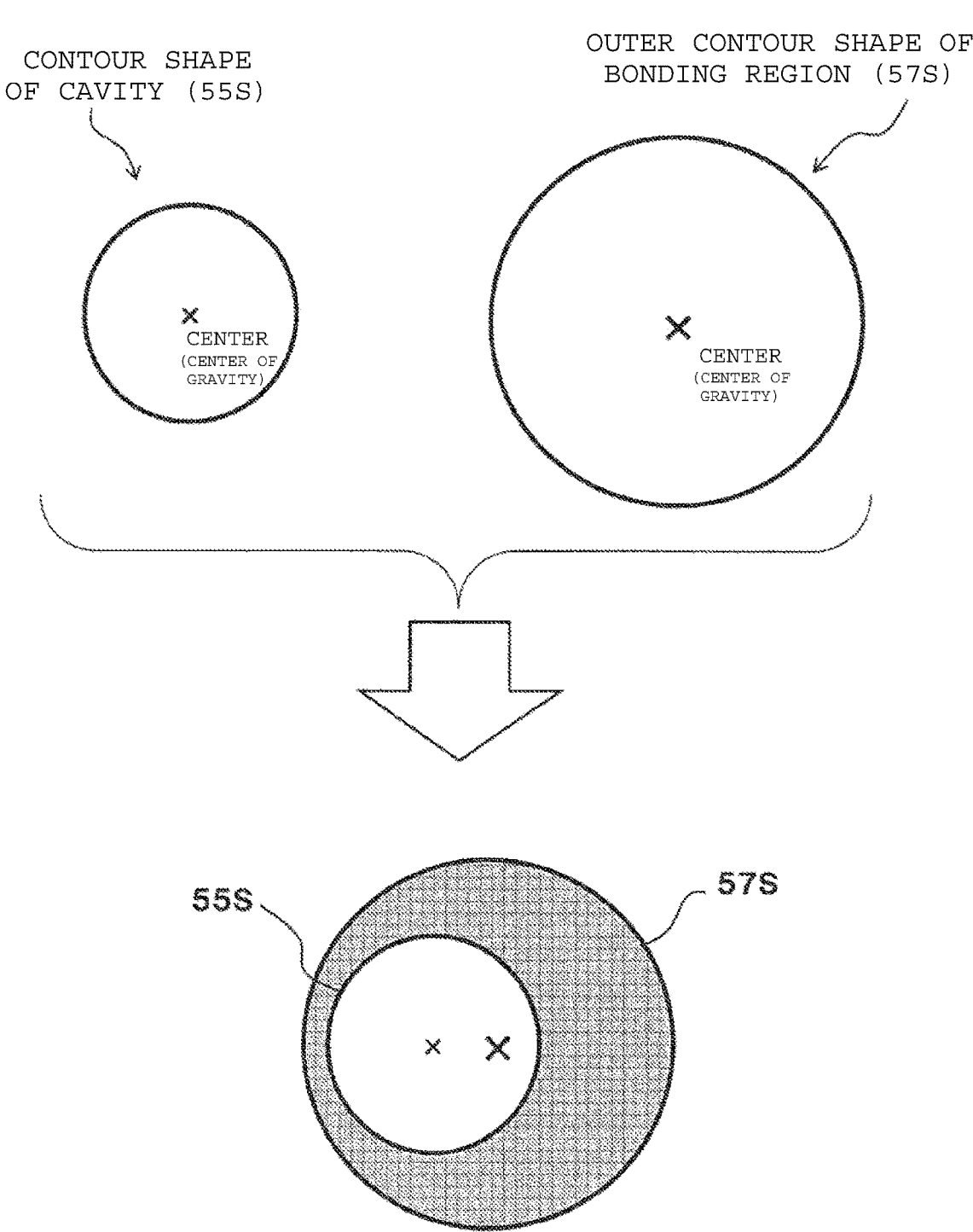
FIG. 5 is a schematic diagram illustrating an "eccentric form".

Further, in the present application, the bonding region 57 may have a form as illustrated in FIG. 3B. The bonding region 57 illustrated on the lower side of FIG. 3B is eccentric with respect to the cavity 55. In such a form as well, a part of the width dimension W of the bonding region 57 located around the cavity 55 is reduced. That is, the width dimension W of the bonding region 57 is not constant along the circumferential direction of the cavity 55 and is non-constant. As illustrated in a plan view of FIG. 3B, one of the portions facing each other is relatively narrower than the other (in the illustrated plan view, a left side portion is relatively narrower than a right side portion, and particularly, it can be said that a leftmost portion forms a "narrow portion"). Note that the "eccentric form" here means that, for example, a center of a contour shape 55S of the cavity 55 (for example, a center of gravity of the shape) and a center of an outer contour shape 57S of the bonding region 57 (for example, a center of gravity of the shape) deviate from each other in a plan view (refer to FIG. 5).

As can be seen from the aspects illustrated in FIGS. 3A and 3B, in the present application, "a part of the width dimension of the bonding region is small" means that the width dimension of the bonding region between the terminal member and the outer case (particularly, the width dimension of the bonding region located around the cavity of the outer case) is non-constant in a plan view, and means that there is a bonding portion having a relatively small width dimension. That is, in the present application, the width dimension of the bonding region may be locally reduced. A reduction portion having such a locally reduced width dimension may be, for example, one portion.

The bonding region having the non-constant width dimension in a plan view may be non-constant in a stepwise manner, or may be gradually non-constant. For example, as illustrated in FIG. 3A, the bonding region may be non-constant in a stepwise manner. That is, when the width dimension is captured along the periphery of the cavity, the bonding region may have a width dimension that changes abruptly or steeply. On the other hand, as illustrated in FIG. 3B, the bonding region may be gradually non-constant. That is, the bonding region may have a width dimension that gradually or gently changes when the width dimension is captured along the periphery of the cavity.

The secondary battery in which a part of the width dimension of the bonding region 57 is reduced or the width dimension thereof is non-constantly reduced is easily cleaved starting from a narrow portion of the bonding region. That is, the "bonding" (that is, the bonding of the terminal member to the outer case with the insulating material interposed therebetween) can be released due to the increased internal pressure of the cell in the secondary battery. More specifically, for example, when the electrode assembly undesirably generates heat or gas is generated inside the cell and the internal pressure of the outer case excessively increases, the "bonding" can be released such that the terminal member is opened outwards from a narrow part. That is, at the time of such an abnormality, it is possible to release the bonding such that the terminal member is displaced to the outside of the battery from the portion of the bonding region where a part of the width dimension is small. Therefore, the present application reduces an undesirable issue in which cleavage is not performed or unintended cleavage occurs when the internal pressure of the cell increases due to excessive bonding strength. In addition, at the time of cleavage, since the terminal member is opened from the narrow part of the bonding region, the predictability is increased, and as such, more suitable battery design based on such cleavage can be performed.

In the present specification, the "outer case" means a member configured to house or enclose the electrode assembly having the electrode-constituting layers laminated therein, the electrode-constituting layers including the positive electrode, the negative electrode, and the separator. For example, the outer case may be a metal outer case having a non-laminated configuration. This means that the outer case is not a laminated member or the like including a metal sheet, a fusion layer, and a protective layer. It can be said that the outer case in the present application may be different from an outer case of a soft case type battery corresponding to a pouch formed of a so-called laminated film. The metal outer case having the non-laminated configuration preferably has a configuration including a single metal member. For example, such a metal outer case may be a single member made of metal such as stainless steel (SUS) and/or aluminum. The term "metal single member" as used herein means that the outer case does not have a so-called laminated configuration in a broad sense, and means that the outer case is a member substantially made only of metal in a narrow sense. Therefore, a surface of the metal outer case may be subjected to an appropriate surface treatment as long as the outer case is the member substantially made only of metal. For example, on a cut surface obtained by cutting such a metal outer case in a thickness direction thereof, a single metal layer can be confirmed except for a portion on which surface treatment or the like is performed. The term "stainless steel" in the present specification refers to, for example, stainless steel defined in "JIS G 0203 Glossary of terms used in iron and steel", and may be chromium or alloy steel containing chromium and nickel.

In the present specification, the "terminal member" means an output terminal provided for connection with an external device in the secondary battery. The terminal member has, for example, a flat plate shape. That is, the terminal member may be a flat plate member. The flat plate-like terminal member may be, for example, a metal plate. Due to the flat plate shape, the terminal member may have a constant thickness. The material of the terminal member is not particularly limited, and may contain at least one metal selected from a group consisting of aluminum, nickel, and copper. The planar view shape of the terminal member is also not particularly limited, and may be, for example, a circular shape or a rectangular shape including a quadrangular shape or the like. For example, the terminal member may have relatively higher rigidity than that of the outer case.

In the present specification, the "insulating material" means a member which is interposed between the outer case and the terminal member and contributes to "insulation" therebetween. The type of the insulating material is not particularly limited as long as the insulating material exhibits its "insulation properties". Preferably, the insulating material has not only "insulation properties" but also "fusing properties". For example, the insulating material may contain a thermoplastic resin. Although it is only one specific example, the insulating material may contain polyolefin such as polyethylene and/or polypropylene. In other words, the insulating bonding material may contain an adhesive component exhibiting insulating properties. Examples of such an adhesive can include an acrylic adhesive such as an acrylic acid ester copolymer, a rubber adhesive such as natural rubber, a silicone adhesive such as silicone rubber, a urethane adhesive such as urethane resin, an $\alpha$-olefin adhesive, an ether adhesive, an ethylene-vinyl acetate resin adhesive, an epoxy resin adhesive, a vinyl chloride resin adhesive, a chloroprene rubber adhesive, a cyanoacrylate adhesive, an aqueous polymer-isocyanate adhesive, a styrene-butadiene rubber adhesive, a nitrile rubber adhesive, a nitrocellulose adhesive, a reactive hot-melt adhesive, a phenol resin adhesive, a modified silicone adhesive, a polyamide resin adhesive, a polyimide adhesive, a polyurethane resin adhesive, a polyolefin resin adhesive, a polyvinyl acetate resin adhesive, a polystyrene resin solvent adhesive, a polyvinyl alcohol resin adhesive, a polyvinylpyrrolidone resin adhesive, a polyvinyl butyral resin adhesive, a polybenzimidazole adhesive, a polymethacrylate resin adhesive, a melamine resin adhesive, a urea resin adhesive, and/or a resorcinol adhesive.

The insulating material is provided so as to fill a gap between the outer case and the terminal member, and it can be understood that the insulating material contributes to "sealing". As illustrated in FIG. 2, the insulating material 70 may be provided so as to extend up to a region outside the terminal member 60. That is, the insulating material 70 may be provided on the outer case 50 so as to protrude outwards from an outer edge of the terminal member 60. In addition, the insulating material 70 may be provided further inside so as to extend beyond a cavity edge 58 forming the cavity 55 of the outer case 50. As can be seen from the form illustrated in FIG. 2, the terminal member 60 may have a shape along the outer case 50. That is, in the sectional view as illustrated in the drawing, the terminal member 60 and a surface of the outer case 50 on which the terminal member is provided may have a mutually parallel arrangement relationship. Similarly, the insulating material 70 may also have a shape along the outer case 50. That is, in the sectional view as illustrated in the drawing, the insulating material 70 and the surface of the outer case 50 on which the insulating material 70 is provided may have a mutually parallel arrangement relationship. The insulating material 70 may have a constant thickness between the outer case 50 and the terminal member 60.

The form of the bonding region 57 in FIGS. 3A and 3B may be caused by the form of the cavity 55 of the outer case 50, the terminal member 60, and the insulating material 70, and in addition thereto or instead thereof, the form of the bonding region 57 may be caused by a way of installing the terminal member 60, the insulating material 70, and the like. For example, when the insulating material 70 is formed so as to have the same recessed portion as that of the bonding region in a plan view, the bonding region 57 illustrated in FIG. 3A can be obtained. In addition, when the eccentric insulating material 70 deviating from a center of the cavity 55 in a plan view is provided, the bonding region 57 illustrated in FIG. 3B can be obtained. Furthermore, the bonding region 57 illustrated in FIG. 3B can also be obtained by installing the terminal member 60 so as to deviate from the center of the cavity 55 in a plan view.

As illustrated in plan views of FIGS. 3A and 3B, an inner edge of the bonding region 57 may be along the cavity of the outer case 50. That is, in a plan view as illustrated in the drawing, a contour of an inner peripheral edge of the bonding region 57 and a contour of the cavity 55 of the outer case may substantially overlap each other. As a result, in the non-cleaved secondary battery, the outer case and the terminal member can be more air tightly bonded or sealed.

In a preferred aspect of the present application, a part of the width dimension of the bonding region is reduced due to at least one planar view shape selected from a group consisting of the cavity, the insulating material, and the terminal member. For example, the recessed portion (that is, the locally narrow portion) of the bonding region according to the aspect is caused by a planar view shape (that is, a contour shape in a plan view) of at least one of the cavity of the outer case, the terminal member attached to the outer case, and the insulating material interposed therebetween.

Figure 6:
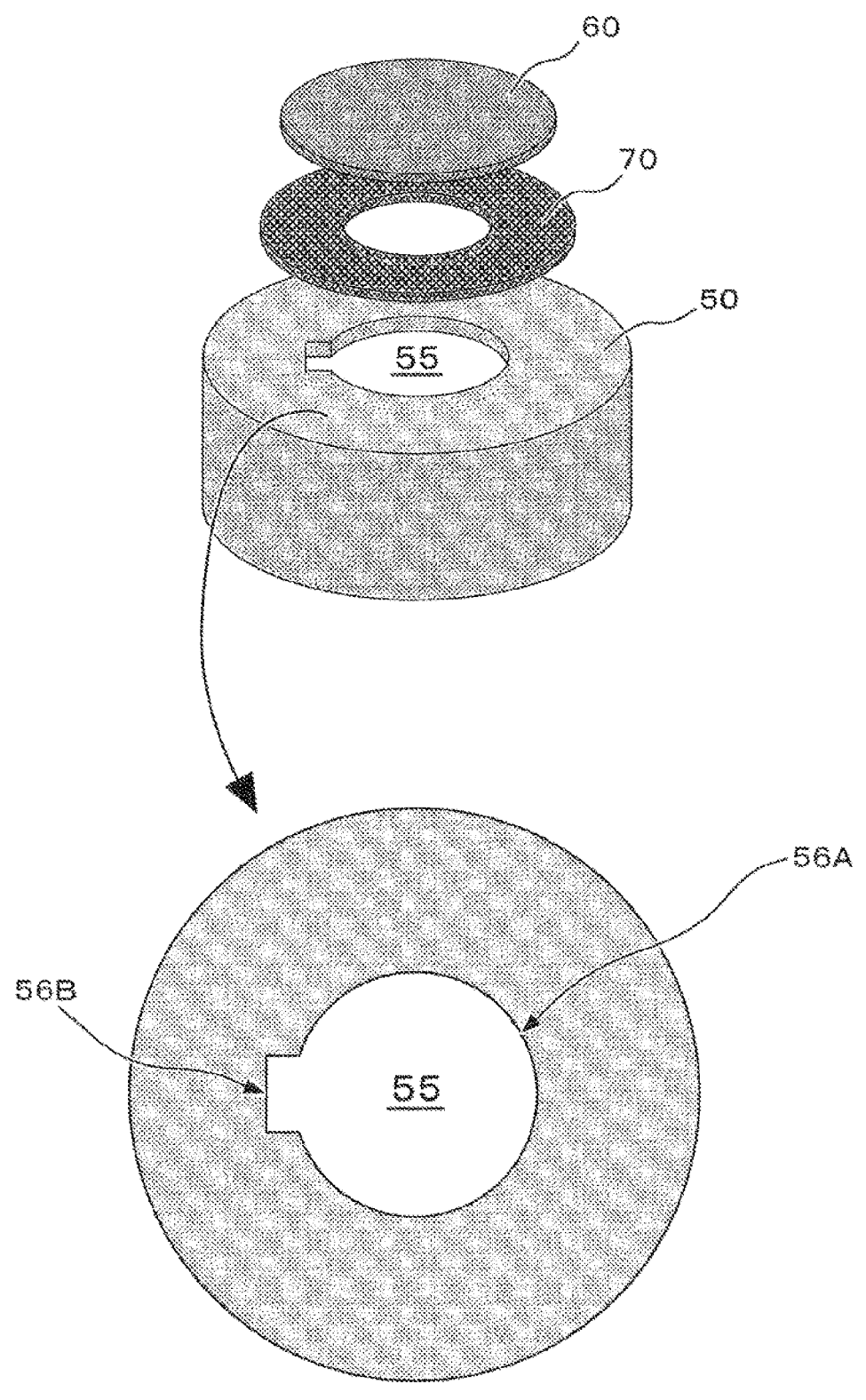
FIG. 6 is a schematic diagram illustrating an exemplary planar view shape of a cavity of the outer case.

When the recessed portion is caused by a planar view shape of the cavity of the outer case, a planar view shape of the cavity 55 may be, for example, a shape as illustrated in FIG. 6. In FIG. 6, the planar view shape of the cavity 55 has a unique shape, and for example, a part of a cavity edge 58 forming a shape of the cavity of the outer case is cut away. In the present application, a part of the width dimension of the bonding region may be reduced due to such a unique shape. That is, due to the unique planar view shape of the cavity 55 of the outer case, a part of an area of a region in which the terminal member and the outer case are bonded may be reduced. As one example, due to the planar view shape of the cavity 55 of the outer case, the area of the region in which the terminal member and the outer case are bonded may be reduced at only one portion.

The planar view shape of the cavity 55 illustrated in FIG. 6 has a shape in which an overall cavity contour 56A (hereinafter also referred to as an "overall cavity contour") and a local cavity contour 56B (hereinafter also referred to as a "local cavity contour") are combined. It can also be said that the relatively small local cavity contour 56B is included in a part of the relatively large overall cavity contour 56A forming a cavity shape in a plan view. In such a combination shape, since a part of the width dimension of the bonding region is reduced corresponding to the local cavity contour, intended cleavage is likely to occur when the internal pressure of the cell increases. That is, when the internal pressure in the outer case is excessively increased, it is possible to perform cleavage so that the terminal member is opened from a portion corresponding to the local cavity contour 56B and to prevent unintended cleavage in which cleavage is performed from other portions.

Figure 7:
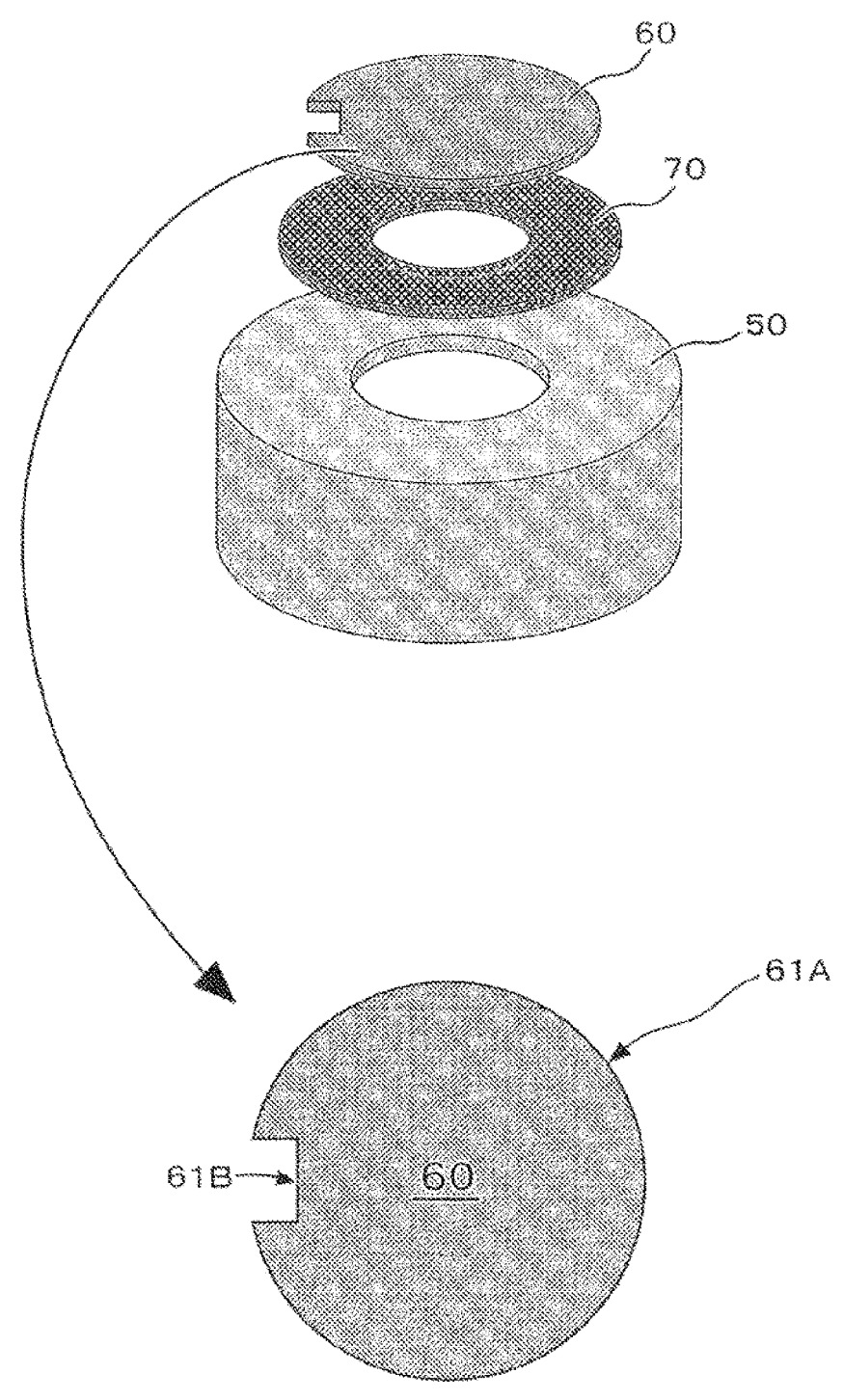
FIG. 7 is a schematic diagram illustrating an exemplary planar view shape of the terminal member.

When the recessed portion (that is, the locally narrow portion) of the bonding region is formed due to the planar view shape of the terminal member 60, the planar view shape of the terminal member 60 may be, for example, a shape as illustrated in FIG. 7. In FIG. 7, the planar view shape of the terminal member 60 has a unique shape, and for example, a part of an outer edge of the terminal member is cut away. In the present application, a part of the width dimension of the bonding region may be reduced due to such a unique shape. That is, due to the unique planar view shape of the terminal member 60, a part of an area of a region in which the terminal member and the outer case are bonded may be reduced. As one example, due to the planar view shape of the terminal member 60, the area of the region in which the terminal member and the outer case are bonded may be reduced at only one portion.

The planar view shape of the terminal member 60 illustrated in FIG. 7 has a shape in which an overall outer contour 61A (hereinafter also referred to as an "overall contour") and a local outer contour 61B (hereinafter also referred to as a "local contour") are combined. It can also be said that the relatively small local contour 61B is included in a part of the relatively large overall contour 61A forming the shape of the terminal member 60 in a plan view. In such a combination shape, since a part of the width dimension of the bonding region is reduced corresponding to the local contour, intended cleavage is likely to occur when the internal pressure of the cell increases. That is, when the internal pressure in the outer case is excessively increased, it is possible to perform cleavage so that the terminal member is opened from a portion corresponding to the local contour 61B and to prevent unintended cleavage in which cleavage is performed from other portions.

Figure 8:
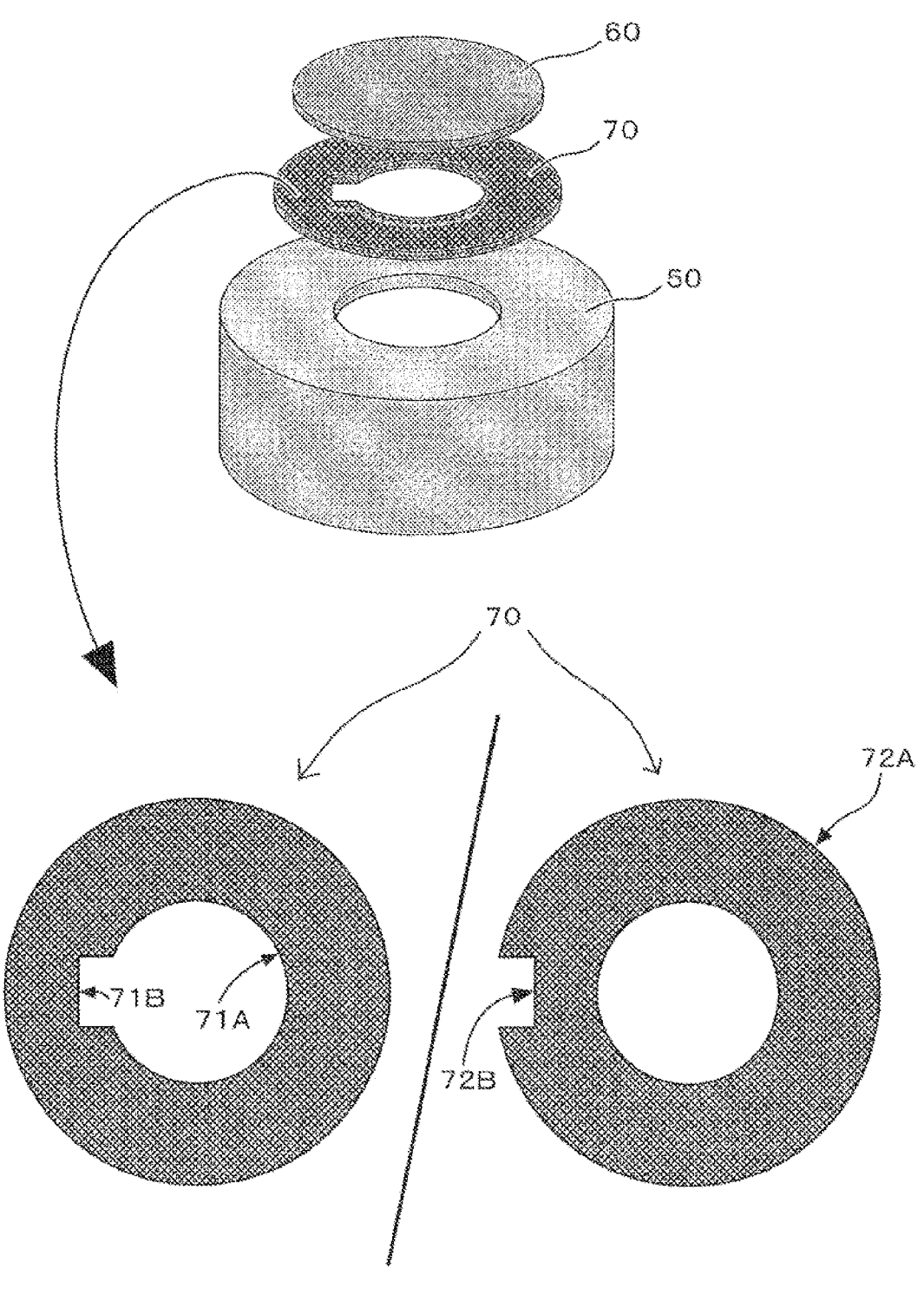
FIG. 8 is a schematic diagram illustrating an exemplary planar view shape of the insulating material.

When the recessed portion (that is, the locally narrow portion) of the bonding region is formed due to the planar view shape of the insulating material 70, the planar view shape of the insulating material 70 may be, for example, a shape as illustrated in FIG. 8. In FIG. 8, the planar view shape of the insulating material 70 has a unique shape, and for example, a part of an inner contour and/or an outer contour of the insulating material having an annular shape is cut away. In the present application, a part of the width dimension of the bonding region may be reduced due to such a unique shape. That is, due to the unique planar view shape of the insulating member 70, a part of an area of a region in which the terminal member and the outer case are bonded may be reduced. As one example, due to the planar view shape of the insulating member 70, the area of the region in which the terminal member and the outer case are bonded may be reduced at only one portion.

The planar view shape of the insulating material 70 illustrated in FIG. 8 may have a shape in which an overall inner contour 71A (hereinafter also referred to as an "overall inner contour") and a local inner contour 71B (hereinafter also referred to as a "local inner contour") are combined (refer to the lower left side of FIG. 8). It can also be said that the relatively small local inner contour 71B is included in a part of the relatively large overall inner contour 71A forming the shape of the insulating material 70 in a plan view. As illustrated on the lower right side of FIG. 8, the planar view shape of the insulating material 70 may have a shape in which an overall outer contour 72A (hereinafter also referred to as an "overall outer contour") and a local outer contour 72B (hereinafter also referred to as a "local outer contour") are combined. It can be said that the relatively small local outer contour 72B is included in a part of the relatively large overall outer contour 72A forming the shape of the insulating material 70 in a plan view. In such a combination shape, since a part of the width dimension of the bonding region is reduced so as to correspond to the local inner contour and/or the local outer contour, intended cleavage is likely to occur when the internal pressure of the cell increases. That is, when the internal pressure in the outer case is excessively increased, it is possible to perform cleavage so that the terminal member is opened from a portion corresponding to the local inner contour 71B or the local outer contour 72B (that is, the terminal member is opened from such a portion as a starting point) and to prevent unintended cleavage in which cleavage is performed from other portions. In the case of the insulating material 70, the planar view shape of the insulating material 70 may have two local contours, that is, both the local inner contour 71B and the local outer contour 72B. Accordingly, it is possible to perform the intended cleavage more remarkably. When both the local inner contour 71B and the local outer contour 72B are provided, the same may be provided at positions adjacent to each other.

In the secondary battery of the present application, at least one planar view shape selected from the group consisting of the cavity, the insulating material, and the terminal member may have a cutaway portion obtained by removing a part of a base shape. That is, at least one contour shape in a plan view selected from the group consisting of the cavity, the insulating material, and the terminal member may have a local contour portion obtained by removing a part of the base shape.

Figure 9:
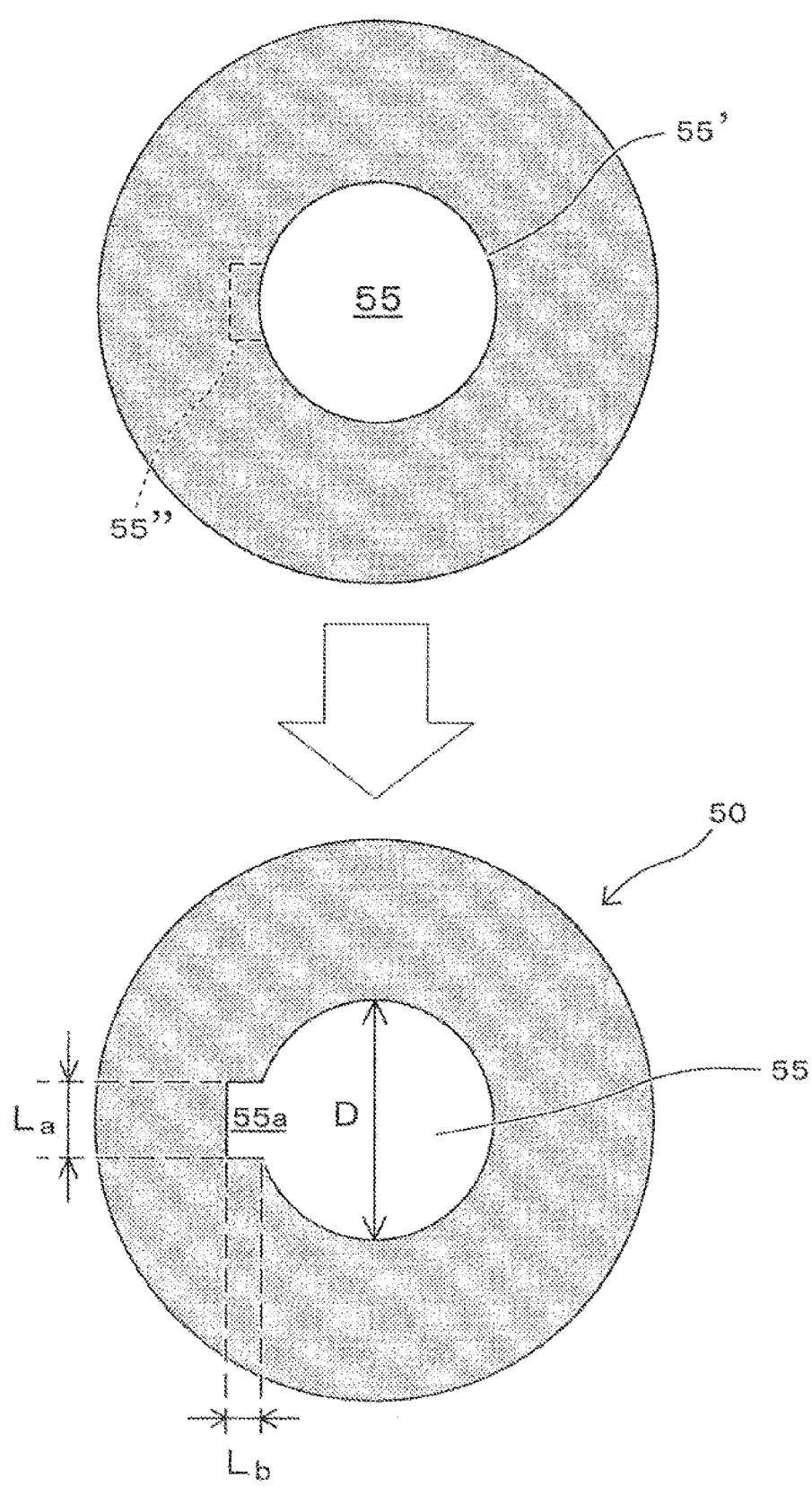
FIG. 9 is a schematic diagram illustrating a cutaway portion obtained by removing a part of a base shape of the cavity of the outer case.

In the exemplified aspect illustrated in FIG. 9, the cavity 55 of the outer case has a cutaway portion 55a obtained by removing a portion 55" from a base shape 55'. In this case, a part of the width dimension of the bonding region is reduced due to the cutaway portion 55a. That is, due to the cutaway portion 55a of the cavity 55, a part of a bonding area between the terminal member and the outer case is reduced.

As for the cavity 55, the base shape 55' may be, for example, a circular shape in a plan view. The "circular shape" as used herein is not limited to a perfect circular shape (that is, simply a "circle" or a "perfect circle"), and includes a substantially circular shape that can be usually included in a "round shape" as recognized by those skilled in the art while being changed from the perfect circular shape. For example, not only a circle or a perfect circle but also a circle whose arc has a locally different curvature may be used, and furthermore, a circle such as an ellipse or a shape derived from a perfect circle may be used. In addition, a shape of the cutaway portion 55a, that is, a "shape of the portion 55" to be removed from the base shape 55'" in a plan view may be, for example, a quadrangular shape. The term "quadrangular shape" used in the present specification means a substantially quadrangular shape, and therefore is broadly construed to include a square, a rectangular shape (a rectangle), a parallelogram, a trapezoid, and the like. In addition, the shape of the portion 55" to be removed from the base shape 55' in a plan view may be a semicircular shape. The "semicircular shape" as used in the present specification is not limited to a half-divided shape of a perfect circle, and includes a half-divided shape of a circular shape that can be included in a concept of a circle in the broadest sense including an ellipse, an egg shape, and the like. A contour of the shape of the cutaway portion 55a (the portion 55' to be removed) is not limited to, for example, an all straight shape, and can include a contour in which at least a part of the contour is curved, and a contour having a corner with an R.

The cutaway portions 55a of the outer case may be collectively formed when the cavity 55 is formed. For example, the cutaway portion 55a and the cavity 55 may be formed substantially simultaneously by punching or laser processing of a metal material for the outer case. Alternatively, the cutaway portion 55a may be formed after the cavity 55 is formed. For example, the cutaway portion 55a may be formed by etching processing, laser processing, or the like after the cavity 55 is formed by punching a metal material or the like.

Figure 10:
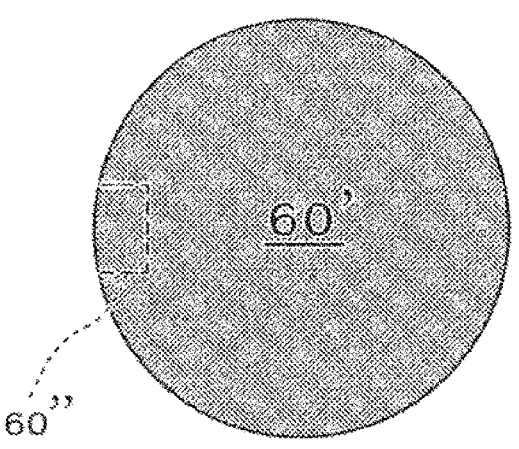
FIG. 10 is a schematic diagram illustrating a cutaway portion obtained by removing a part of a base shape of the terminal member.
Figure 10:
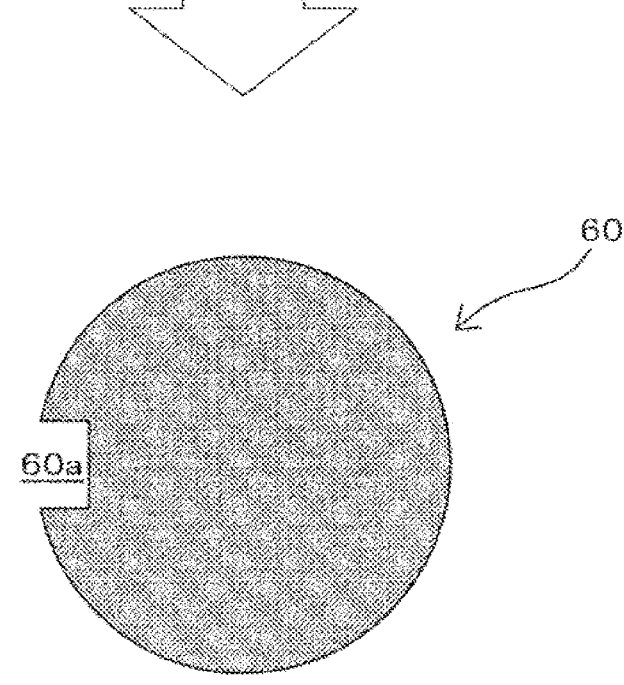

In the exemplified aspect illustrated in FIG. 10, the terminal member 60 has a cutaway portion 60a obtained by removing a portion 60' from a base shape 60'. In this case, a part of the width dimension of the bonding region is reduced due to the cutaway portion 60a. That is, due to the cutaway portion 60a of the terminal member 60, a part of a bonding area between the terminal member and the outer case is reduced.

The base shape 60' of the terminal member 60 may be, for example, a circular shape in a plan view. The term "circular shape" as used herein is the same as described above. Alternatively, a shape of the cutaway portion 60a, that is, a "shape of the portion 60' to be removed from the base shape 60'" in a plan view may be, for example, a quadrangular shape. In addition, the shape of the portion 60" to be removed from the base shape 60' in a plan view may be a semicircular shape. The "quadrangular shape" and the "semicircular shape" as used herein are the same as described above. A contour of the shape of the cutaway portion 60a (the portion 60' to be removed) is not limited to, for example, an all straight shape, and can include a contour in which at least a part of the contour is curved, and a contour having a corner with an R.

The cutaway portions 60a of the terminal member 60 may be collectively formed when the terminal member 60 is formed. For example, the cutaway portion 60a may be formed substantially simultaneously when the terminal member is formed by punching or laser processing of a metal material for the terminal member. Alternatively, the cutaway portion 60a may be formed after the terminal member 60 is once formed. For example, the cutaway portion 60a may be formed by etching processing, laser processing, or the like after the terminal member 60 is formed by punching a metal material or the like.

Figure 11:
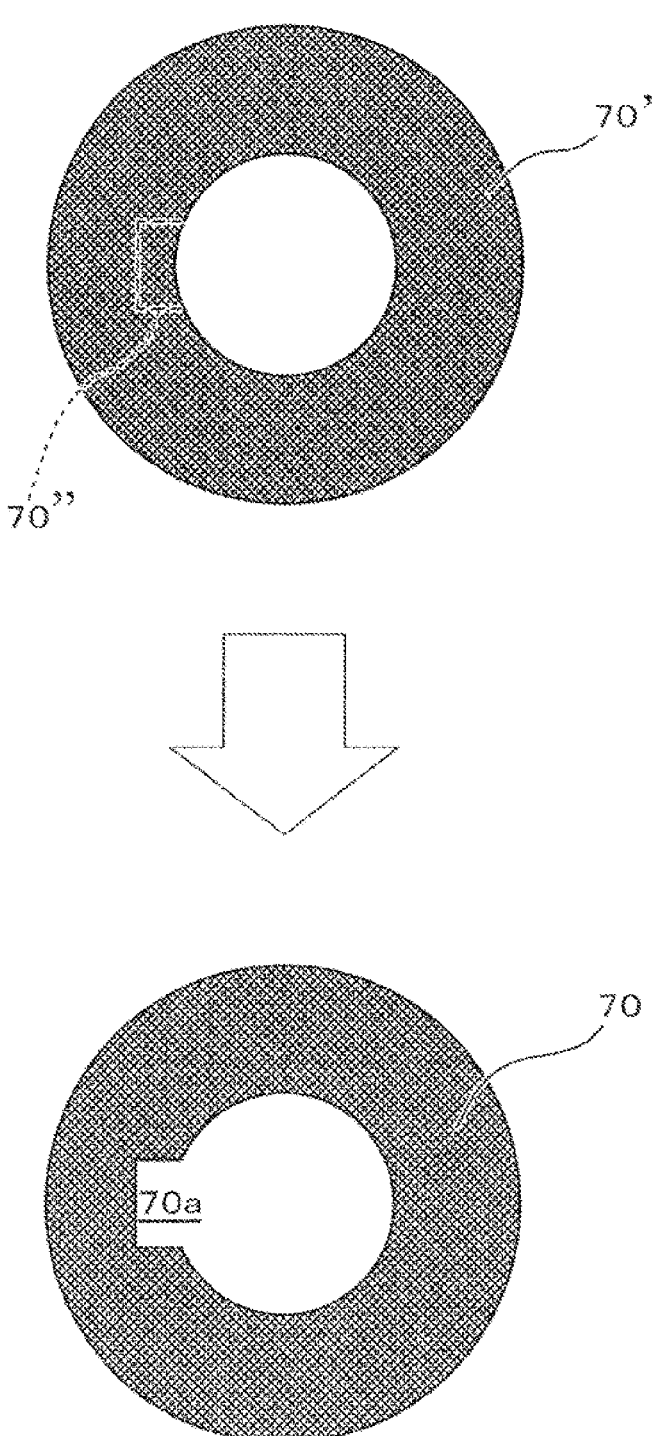
FIG. 11 is a schematic diagram illustrating a cutaway portion obtained by removing a part of a base shape of the insulating material.

In the exemplified aspect illustrated in FIG. 11, the shape of the insulating material 70 has a cutaway portion 70a obtained by removing a portion 70" from a base shape 70'. In this case, a part of the width dimension of the bonding region is reduced due to the cutaway portion 70a. That is, due to the cutaway portion 70a of the insulating material 70, a part of a bonding area between the terminal member and the outer case is reduced.

The base shape 70' of the insulating material 70 may be, for example, an annular shape (particularly, an annular shape in which both an inner contour and an outer contour are circular shapes) in a plan view. The "circular shape" on which this annular shape is based is the same as described above. In addition, a shape of the cutaway portion 70a, that is, a shape of the portion 70" to be removed from the base shape 70' in a plan view may be, for example, a quadrangular shape. Alternatively, the shape of the portion 70' to be removed from the base shape 70' in a plan view may be a semicircular shape. The "quadrangular shape" and the "semicircular shape" as used herein are also the same as described above. A contour of the shape of the cutaway portion 70a (the portion 70" to be removed) is not limited to, for example, an all straight shape, and can include a contour in which at least a part of the contour is curved, and a contour having a corner with an R. In addition, FIG. 11 illustrates a form in which the cutaway portion 70a is provided in an inner contour of the insulating material 70 having an annular shape in a plan view, but instead thereof or in addition thereto, a cutaway portion may be provided in an outer contour of the insulating material 70 having an annular shape.

The cutaway portion 70a of the insulating material 70 may be formed when the insulating material 70 is installed. For example, an insulating material precursor having a cutaway portion in advance through mechanical processing or the like may be used, and the cutaway portion 70a may be provided in the insulating material 70 by disposing the insulating material precursor on an outer case. Alternatively, when the insulating material 70 is provided on the outer case by raw material application, the cutaway portion 70a can be provided in the insulating material 70 by performing an application operation so that the applied shape has a cutaway shape. Alternatively, the cutaway portion 70a may be formed after the insulating material is once formed. For example, after the insulating material 70 is provided through the arrangement of the insulating material precursor and the application of the raw material, the cutaway portion 70a can be provided in the insulating material 70 by removing a part of the insulating material 70 by a mechanical means and/or a chemical means.

When the cutaway portion as described above exists in at least one of the cavity 55 of the outer case 50, the terminal member 60, and the insulating material 70, a part of the width dimension of the bonding region is reduced so as to correspond to the cutaway portion, and as such, intended cleavage is likely to occur when the internal pressure of the cell increases. Therefore, when the internal pressure in the outer case is excessively increased, the terminal member is cleaved so as to be opened from the vicinity of the cutaway portion, and cleavage from other portions can be prevented.

Particularly, the cutaway portion may be provided singly for each of the cavity 55 of the outer case 50, the terminal member 60, and the insulating material 70. That is, instead of a plurality of cutaway portions, only one cutaway portion may be provided in each of the cavity 55 of the outer case 50, the terminal member 60, and the insulating material 70. In addition, a single cutaway portion may be provided in any one of the cavity 55 of the outer case 50, the terminal member 60, and the insulating material 70. This is because the effect of the cutaway portion becomes remarkable. That is, in the case of such a single cutaway portion, the terminal member is cleaved so as to be opened from the cutaway portion and/or the vicinity thereof, and the effect of preventing cleavage from other portions is more easily exhibited.

In a preferred aspect, at least, a part of the tab and a part of the cutaway portion overlap each other when viewed in a plan perspective view. The tab is a conductive member electrically connected to the positive electrode or the negative electrode of the electrode assembly, and protrudes from the electrode assembly. The tab is attached to an inner main surface of the terminal member through the cavity of the outer case, and is responsible for electrical connection between the terminal member and the electrode layer of any one of the positive electrode and the negative electrode of the electrode assembly.

As described above, the cutaway portion is a portion obtained by removing a portion from the base shape in at least one planar view shape selected from the group consisting of the cavity, the insulating material, and the terminal member. Here, when the tab and the cutaway portion have an arrangement relationship in which, at least, a part of the tab and a part of the cutaway portion overlap each other in a plan view, the opening of the terminal member can be more suitable at the time of cleavage. This is because the tab connected to the terminal member hardly acts adversely so as to impair cleavage force. That is, in the case of the cutaway portion, the cleavage force is generated in the terminal member so that the terminal member is opened from the vicinity thereof, but in an arrangement form in which the tab and the cutaway portion overlap each other, a suitable "play" is easily provided to the tab connected to the terminal member, and the intended cleavage can be smoothly performed.

Preferably, the tab includes a portion extending along a main surface of the electrode assembly, and the cutaway portion is positioned on a "virtual tab line" (particularly, a virtual line extending in a direction in which the tab extends so that the virtual tab line overlaps the tab when viewed in a plan perspective view). That is, such a virtual line can be said to be a line extending so as to overlap the tab portion extending along the main surface of the electrode assembly.

Figure 12A:
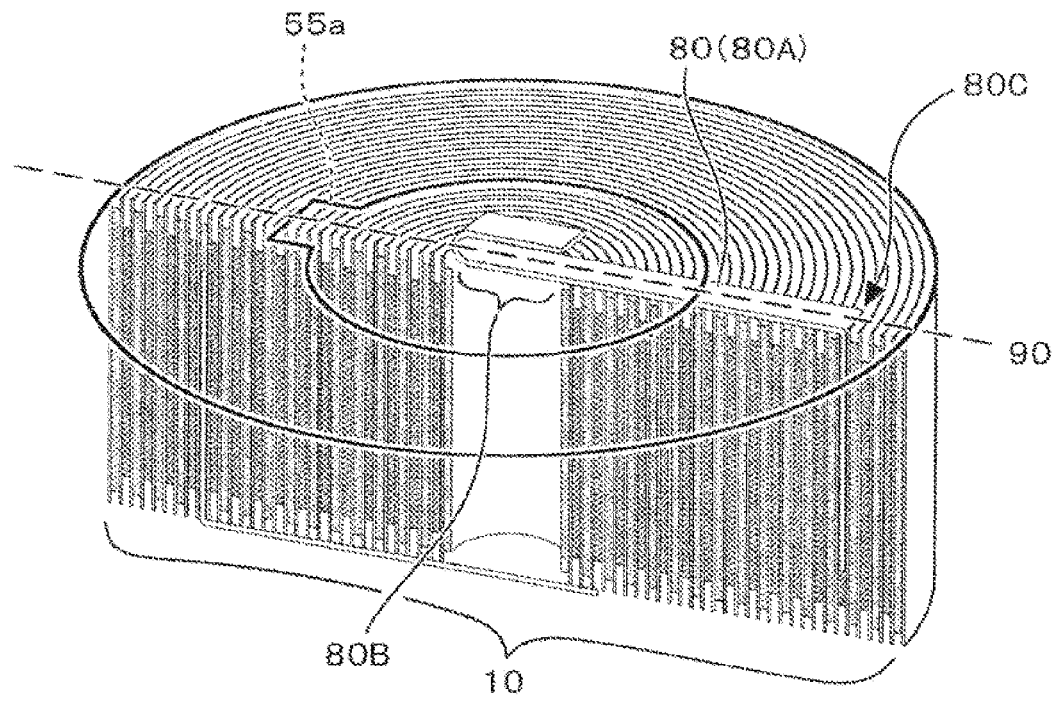
FIG. 12A is a see-through view schematically illustrating an aspect in which the cutaway portion is positioned on a virtual tab line and a sectional view schematically illustrating an exemplary aspect of bonding release.
Figure 12A:
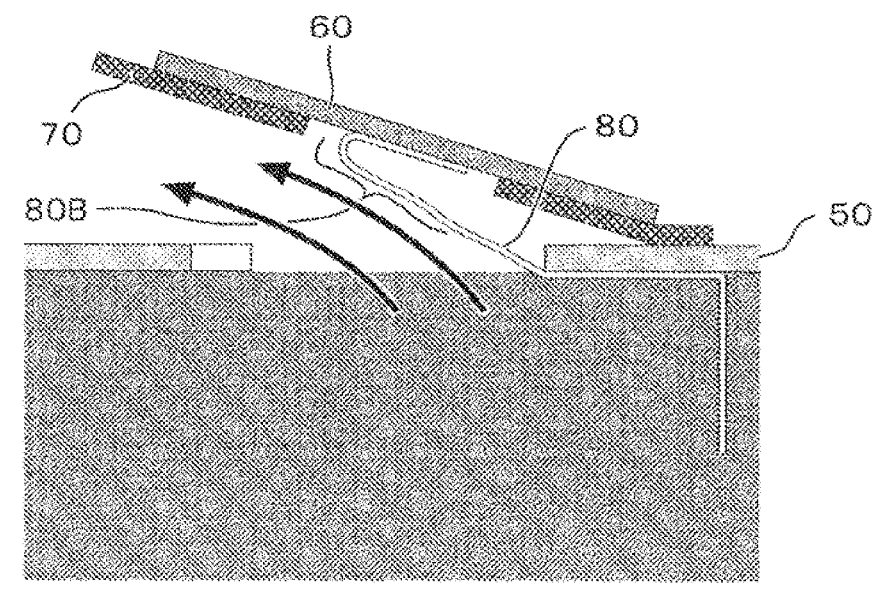
Figure 12B:
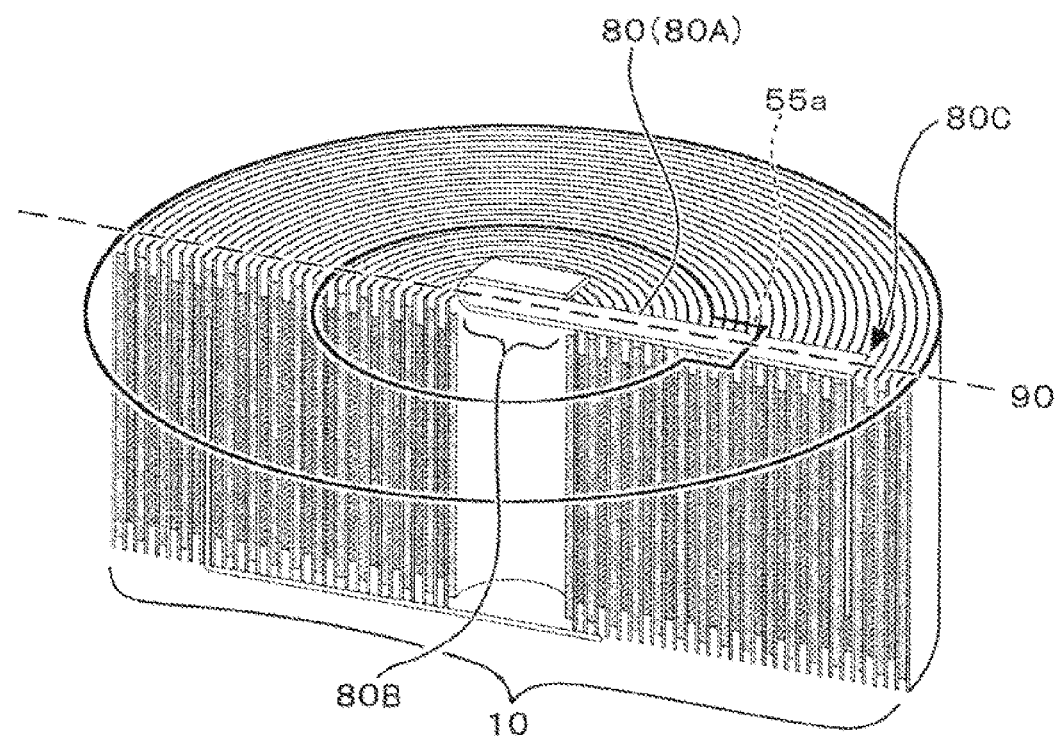
FIG. 12B is a see-through view schematically illustrating an aspect in which the cutaway portion is positioned on the virtual tab line and a sectional view schematically illustrating an exemplary aspect of bonding release.
Figure 12B:
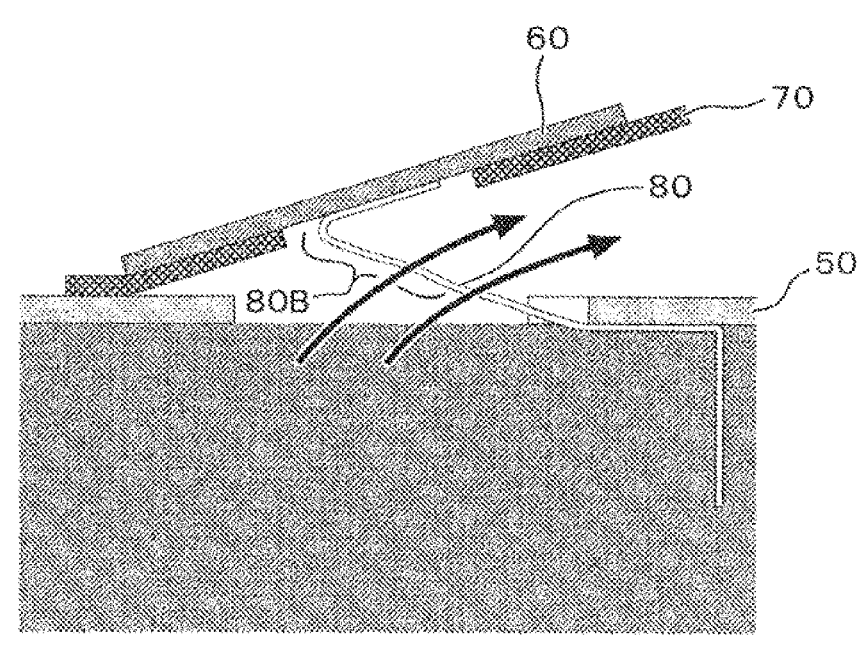

FIGS. 12A and 12B illustrate exemplified aspects of a case in which the "cutaway portion" is the cutaway portion 55a of the cavity of the outer case. As illustrated in FIGS. 12A and 12B, a tab 80 includes a portion 80A extending along a main surface (an upper surface as illustrated in the drawings) of the electrode assembly 10. In such a case, the cutaway portion 55a may be positioned on a virtual tab line 90 extending in a direction in which the tab 80A extends so that the virtual tab line 90 overlaps the tab 80. In such a case, as illustrated on the lower side of each of FIGS. 12A and 12B, when the terminal member 60 is cleaved, opening of the terminal member 60 is suitably assisted. This is because the tab connected to the terminal member is less likely to be twisted when the terminal member 60 is opened from the vicinity of the cutaway portion 55a, and a suitable "play" is more easily provided to the tab. Further, a length of the tab between the electrode assembly and the terminal member may be relatively long to such an extent that opening of the terminal member is not undesirably hindered at the time of cleavage (particularly, the tab length may be longer than a conventional tab length). That is, the tab may have a length in which an excessive force that hinders suitable opening of the terminal member does not act between the terminal member and the electrode assembly 10.

Figure 13:
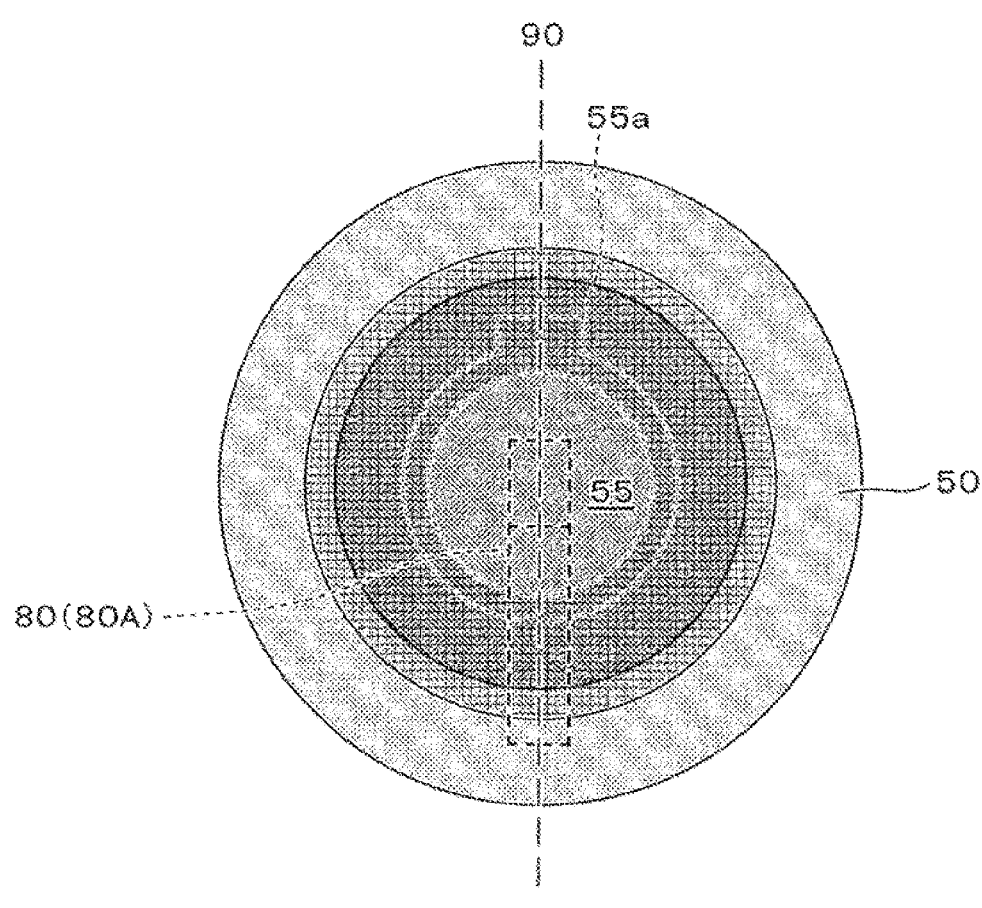
FIG. 13 is a schematic diagram illustrating an aspect in which the cutaway portion is positioned on the virtual tab line.

FIG. 13 schematically illustrates a plan perspective view of the secondary battery. As illustrated in the drawing, the cutaway portion 55a is provided on the virtual tab line 90 of the tab 80 (particularly, the tab portion 80A extending substantially parallel to the main surface of the electrode assembly). In a plan view, the cutaway portion 55a may be positioned on the virtual tab line 90 extending in a direction in which the tab 80 extends so that the virtual tab line 90 overlaps the tab 80. As can be seen from such matters, the "virtual tab line" used in the present specification means a virtual line in a plan view extending so as to overlap a tab portion extending substantially parallel to a surface of the electrode assembly (as illustrated in the drawing, a surface closest to the cavity, that is, the upper surface), among the tabs protruding from the electrode assembly and contributing to electrical connection with the electrode terminal.

In the secondary battery of the present application, the tab may have a folded form. That is, the tab may extend so as to be folded back between the electrode assembly and the terminal member.

In a preferred aspect, the tab 80 protruding from the electrode assembly 10 is connected to the terminal member 60 in a folded state at least once, as illustrated in FIGS. 12A and 12B. In such a case, when the terminal member 60 is cleaved, a folded portion 80B functions like a spring, and the opening of the terminal member 60 can be more suitably assisted (refer to the views on the lower side of FIGS. 12A and 12B). That is, the opening of the terminal member 60 at the time of cleavage can be more suitably assisted by the force (that is, urging force) received from the folded tab 80.

As illustrated in FIGS. 12A and 12B, the folded portion 80B of the tab 80 may be attached to a main surface of the terminal member 60 (particularly, the main surface on the inner side of the outer case). As illustrated in the drawing, the folded portion 80B of the tab may be attached to a center of the main surface of the terminal member 60. This is because the spring force caused by the folded portion is easily transmitted to the terminal member without bias.

Here, a difference between the aspects of FIGS. 12A and 12B will be described. In FIG. 12B, the cutaway portion 55a on the virtual tab line 90 in a plan perspective view is positioned between a tab protruding portion 80C at which the tab 80 protrudes from the electrode assembly 10 and the folded portion 80B. As illustrated in FIG. 12B, in a plan view, the tab 80 and the cutaway portion 55a (particularly, the cutaway portion 55a on the virtual tab line 90) directly overlap each other. On the other hand, in FIG. 12A, the cutaway portion 55a on the virtual tab line 90 in the plan perspective view is not positioned between the tab protruding portion 80C and the folded portion 80B. As illustrated in FIG. 12A, in a plan view, the tab 80 and the cutaway portion 55a (particularly, the cutaway portion 55a on the virtual tab line 90) do not directly overlap each other. In either aspect, when the terminal member 60 is cleaved, the terminal member is opened from the vicinity of the cutaway portion 55a, and the opening of the terminal member 60 can be assisted by the spring force caused by the folded portion.

The present application can be embodied in various aspects. Hereinafter, various aspects will be described according to an embodiment.

In this aspect, a cavity of an outer case has a circular shape in a plan view. That is, the planar view shape of the cavity of the outer case may have various forms, and in this aspect, as illustrated in FIGS. 6 to 9 referred to above, the cavity 55 of the outer case has a circular shape in a plan view. In such a case, a recessed part may be provided in a part of a peripheral edge of the circular shape in a plan view. That is, a recessed part corresponding to the above-described cutaway portion 55a may be provided.

A size of the cutaway portion 55a in a plan view is smaller than a size of the cavity 55 having a circular shape in a plan view (particularly, a size in a plan view before the cutaway). For example, the size of the cutaway portion 55a in the plan view is considerably smaller than the size of the cavity 55 having the circular shape in the plan view. This will be described with reference to FIG. 9. Assuming that a diameter of the cavity 55 (a portion at which no cutaway portion is present) having a circular shape in a plan view is defined as D and two dimensions of the cutaway portion 55a are defined as La and Lb, $0.001D < La < 0.3D$ and $0.001D < Lb < 0.3D$ may be approximate, or $0.005D < La < 0.1D$ and $0.005D < Lb < 0.1D$, or $0.01D < La < 0.1D$ and $0.01D < Lb < 0.1D$ may be preferable.

Since a circular shape in a plan view has less shape anisotropy, the effect of the cutaway portion 55a is more easily exhibited by providing a recessed part as the cutaway portion 55a in the circular shape. That is, when the internal pressure in the outer case is excessively increased, the terminal member is cleaved so as to be opened from the vicinity of the recessed part, and the effect of preventing the cleavage from other portions is more easily performed. Note that only one recessed part may exist in the peripheral edge of the circular shape in the plan view. This is because the effect of the recessed part becomes remarkable. That is, the terminal member is easily opened from the recessed part at the time of cleavage, and cleavage from an unintended portion is more effectively and easily prevented.

When the cutaway portion is provided in the cavity of the outer case as described above, it is easy to align the tab with the direction as compared with the case in which the cutaway portion is provided in the terminal member or the insulating material. That is, the cutaway portion of the outer case is relatively easily positioned on the virtual tab line.

Figure 14:
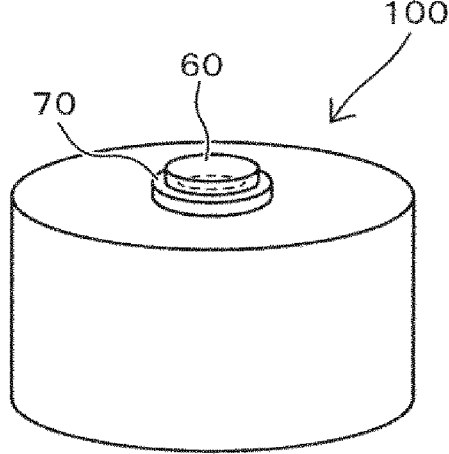
FIG. 14 is a perspective view schematically illustrating an exemplary embodiment of a button type or coin type secondary battery.

In this aspect, an overall planar view shape of the secondary battery is a circular shape. That is, a secondary battery 100 is a button type or a coin type in terms of an outer shape (refer to FIG. 14).

The fact that the planar view shape of the secondary battery is a circular shape means that the shape of an electrode assembly and/or an outer case enclosing the electrode assembly is a substantially circular shape when the electrode assembly is viewed from the upper side or the lower side along the laminating direction of a positive electrode and a negative electrode.

The "circular shape" as used herein is not limited to a perfect circular shape (that is, simply a "circle" or a "perfect circle"), and includes a substantially circular shape that can be usually included in a "round shape" as recognized by those skilled in the art while being changed from the perfect circular shape. For example, not only a circle or a perfect circle but also a circle whose arc has a locally different curvature may be used, and furthermore, a circle such as an ellipse or a shape derived from a perfect circle may be used. In a typical example, a battery having such a circular shape in a plan view corresponds to a so-called button type or coin type battery.

In the secondary battery whose planar view shape is a circular shape, the planar view shape of the cavity of the outer case may be a circular shape, or the planar view shape of the terminal member may also be a circular shape (the circular shape used herein is similar to the circular shape described with respect to the planar view shape of the secondary battery). In such a case, in the present application, the bonding region has an annular form, and a part of the width dimension of the annular bonding region is reduced.

This aspect is an aspect in which the electrode assembly is a wound type. That is, the electrode assembly has a wound structure formed by winding an electrode unit including a positive electrode, a negative electrode, and a separator disposed between the positive electrode and the negative electrode in a roll shape (refer to FIG. 1(B)).

In the case of the wound electrode assembly, as illustrated in FIGS. 12A and 12B, preferably, the tab 80 can be extended from one portion of the wound side surface. Therefore, the tab can be easily extended along the main surface (the upper surface as illustrated in the drawings) of the electrode assembly 10, and the "aspect in which the cutaway portion is positioned on the virtual tab line" can be easily adopted. In addition, since the thin tab protrudes from only one portion as described above, the tab is easily folded. That is, the tab having flexibility is easily folded and connected to the terminal member, and furthermore, a "spring characteristic at a folded portion" that assists opening of the terminal member at the time of cleaving the terminal member is easily provided.

This aspect is an aspect in which the outer case mainly includes two parts. For example, the outer case may include two parts including a first metal outer case and a second metal outer case which are metal members. In the case of an outer case having a non-laminated configuration, each of the first metal outer case and the second metal outer case may be a single metal member. In the present application, the outer case may have a relatively thin thickness. For example, each of the first metal outer case and the second metal outer case may have a thickness dimension of 50 μm or more and less than 200 μm, for example, 50 μm or more and 190 μm or less, 50 μm or more and 180 μm or less, or 50 μm or more and 170 μm or less.

In the outer case including the two parts including the first metal outer case and the second metal outer case, the above-mentioned "cavity" may be provided on one of the first metal outer case and the second metal outer case. That is, the cavity may be provided on one of the first metal outer case and the second metal outer case, and the insulating material and the terminal member may be provided on one of the sub outer cases having the cavity therein. The first metal outer case and the second metal outer case, which are metal members, may be combined with each other without being caulked, thereby forming the outer case.

One of the first metal outer case and the second metal outer case may be a cup-like member, and the other of the first metal outer case and the second metal outer case may be a lid-like member. In such a case, for example, the metal outer cases may be joined to each other by welding a peripheral edge portion of the lid-like member from the outside, whereby relatively simple sealing can be performed. The "cup-like member" means a member that includes a side wall or a side surface portion corresponding to a body portion and a main surface portion (in a typical aspect, for example, a bottom portion) continuous with the side wall or the side surface portion, and in which a hollow portion is formed. The "lid-like member" means a member (preferably, a member covering the cup-like member so as to extend over the side wall of the cup-like member) provided so as to cover the cup-like member. The lid-like member may be, for example, a single member (typically, a flat plate-like member) extending on the same plane, and may be particularly a member provided so as to cover the side wall of the cup-like member. In such a case, the above-described "cavity" may be provided on the lid-like member, and therefore, the insulating material and the terminal member may be provided on the sub outer case of the lid-like member. Alternatively, the "cavity" described above may be provided on the cup-like member, and therefore, the insulating material and the terminal member may be provided on the sub outer case of the cup-like member. Alternatively, each of the first metal outer case and the second metal outer case may be a cup-like member. That is, the outer case may be formed of at least the first metal outer case which is the cup-like member and the second metal outer case which is also the cup-like member. In this case, the first metal outer case and the second metal outer case of the cup-like member may be combined so that side walls thereof are aligned with each other to form the outer case. The "cavity" described above may be provided on the cup-like member of any one of the first metal outer case and the second metal outer case, and therefore the insulating material and the terminal member may be provided on the cup-like member.

Although one or more embodiments of the present application have been described above, only typical examples have been illustrated. Accordingly, those skilled in the art will readily appreciate that the present application is not limited thereto and that various aspects are contemplated.

Figure 15:
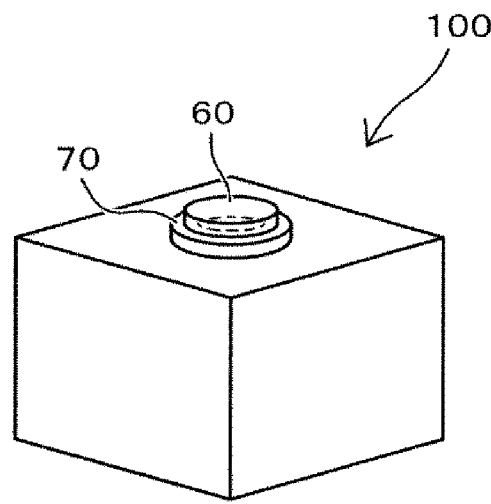
FIG. 15 is a perspective view schematically illustrating an exemplary embodiment of a rectangular secondary battery.

For example, in the above description, a button-type or coin-type secondary battery has been mentioned as a "secondary battery having a circular shape in a plan view", but the present application is not necessarily limited thereto. For example, a rectangular secondary battery may be used (refer to, for example, FIG. 15). That is, the planar view shape of the secondary battery 100 is not limited to a circular shape, and may have a quadrangular shape, a rectangular shape, or the like.

Further, in the above description, the drawings on the premise that the electrode assembly particularly has the wound structure have been referred to, but the present application is not necessarily limited to the electrode assembly having the wound structure. That is, the present application may be premised on an electrode assembly having a planar laminated structure, or may be premised on an electrode assembly having a stacked-and-folded type structure, as long as the characteristics thereof are not unique to the wound structure.

A secondary battery according to the present application can be used in various fields in which electric storage is assumed. As a mere example, the secondary battery of the present application can be used in the fields of electricity, information, and communication in which electricity, electronic equipment, and the like are used (for example, electric and electronic equipment fields or mobile equipment fields including mobile phones, smartphones, notebook computers and digital cameras, activity meters, arm computers, electronic paper, wearable devices, and small electronic machines such as RFID tags, card type electronic money, and smartwatches), home and small industrial applications (for example, the fields of electric tools, golf carts, and home, nursing, and industrial robots), large industrial applications (for example, the fields of forklift, elevator, and harbor crane), transportation system fields (for example, the fields of hybrid vehicles, electric vehicles, buses, trains, power-assisted bicycles, electric two-wheeled vehicles), power system applications (for example, the fields of various types of power generation, road conditioners, smart grids, and household power storage systems), medical applications (medical equipment fields such as earphone hearing aids), pharmaceutical applications (fields such as dosage management systems), IoT fields, space and deep sea applications (for example, the fields of a space probe and a submersible), and the like.

DESCRIPTION OF REFERENCE SYMBOLS

1: Positive electrode
2: Negative electrode
3: Separator
5: Electrode-constituting layer
10: Electrode assembly
50: Outer case
55: Cavity of outer case
55': Base shape of cavity of outer case
55": Portion to be removed from base shape
55a: Cutaway portion
55S: Contour shape of cavity 55
56A: Overall cavity contour (overall cavity contour)
56B: Local cavity contour (local cavity contour)
57: Bonding region around cavity
57A: Recessed portion
57B: Narrow portion
57S: Outer contour shape of bonding region
58: Cavity edge of outer case
59: Outer case surface around cavity
60: Terminal member
60': Base shape of cavity of terminal member
60": Portion to be removed from base shape
60a: Cutaway portion
61A: Overall outer contour (overall contour)
61B: Local outer contour (local contour)
70: Insulating material
70': Base shape of cavity of insulating material
70": Portion to be removed from base shape
70a: Cutaway portion
71A: Overall inner contour (overall inner contour)
71B: Local inner contour (local inner contour)
72A: Overall outer contour (overall outer contour)
72B: Local outer contour (local outer contour)
80: Tab
80A: Tab portion extending along main surface of electrode assembly
80B: Folded portion of tab
80C: Tab protruding portion
90: Virtual tab line
100: Secondary battery
W: Width dimension of bonding region It should be appreciated that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery including an electrode assembly and an outer case configured to house the electrode assembly, comprising:
   a terminal member provided on the outer case with an insulating material interposed therebetween, the terminal member being connected to a tab of the electrode assembly, wherein
   the outer case is provided with a cavity through which the tab passes, and the terminal member is bonded onto a surface of the outer case with the insulating material interposed therebetween, the surface being positioned around the cavity, and
   a bonding surface between the outer case and the insulating material has a width dimension in a plan view, the width dimension of the bonding surface varies along the circumferential direction of the cavity and has a first side portion that is narrower than a second side portion,
   wherein a contour of the cavity has a first center, and an outer contour of the bonding surface has a second center, where the first center and the second center are deviated from each other.

2. The secondary battery according to claim 1, wherein the width dimension of the bonding surface around the cavity is non-constant in the plan view.

3. The secondary battery according to claim 1, wherein the first part of the width dimension of the bonding surface is reduced due to at least one planar view shape selected from a group consisting of the cavity, the insulating material, and the terminal member.

4. The secondary battery according to claim 1, wherein the at least one planar view shape selected from the group consisting of the cavity, the insulating material, and the terminal member has a cutaway portion obtained by removing a part of a base shape.

5. The secondary battery according to claim 4, wherein, at least, a part of the tab and a part of the cutaway portion overlap each other when viewed in a plan perspective view.

6. The secondary battery according to claim 5, wherein the tab includes a portion extending along a main surface of the electrode assembly, and
   the cutaway portion is positioned on a virtual tab line extending in a direction in which the tab extends so that the virtual tab line overlaps the tab when viewed in the plan perspective view.

7. The secondary battery according to claim 1, wherein the cavity has a circular shape in the plan view, and has a recessed part in a part of a peripheral edge of the circular shape in the plan view.

8. The secondary battery according to claim 7, wherein only the one recessed part exists in the circular shape in the plan view.

9. The secondary battery according to claim 1, wherein the bonding surface is eccentric with respect to the cavity in the plan view.

10. The secondary battery according to claim 1, wherein the tab is connected to the terminal member in a folded state.

11. The secondary battery according to claim 1, wherein the bonding is releasable due to an increased internal pressure of a cell of the secondary battery.

12. The secondary battery according to claim 1, wherein an electrode of the electrode assembly includes a positive electrode and a negative electrode capable of occluding and releasing lithium ions.

13. The secondary battery according to claim 1, wherein the bonding surface includes a third part of the width dimension, which is different from each of the first part of the width dimension and the second part of the width dimension.

14. The secondary battery according to claim 1, wherein in the plan view, an overall inner contour defining the shape of an insulating material includes, in a part thereof, the local inner contour having a smaller width.

* * * * *